United States Patent [19]
Sato et al.

[11] Patent Number: 5,649,244
[45] Date of Patent: Jul. 15, 1997

[54] MULTI-FUNCTION CAMERA HAVING COLOR COORDINATED OPERATIONAL MODES AND MANIPULATION MEMBERS

[75] Inventors: Shigemasa Sato, Yokohama; Ken Moro; Nobuya Kawahata, both of Yokosuka, all of Japan

[73] Assignee: Nikon Corporation, Tokyo, Japan

[21] Appl. No.: 668,367

[22] Filed: Jun. 18, 1996

Related U.S. Application Data

[63] Continuation of Ser. No. 389,163, Feb. 15, 1995, abandoned.

[30]    Foreign Application Priority Data

Feb. 15, 1994  [JP]  Japan .................................. 6-018623
Sep. 7, 1994   [JP]  Japan .................................. 6-214109

[51] Int. Cl.⁶ ................................................. G03B 17/18
[52] U.S. Cl. ........................ 396/287; 396/291; 396/292
[58] Field of Search ......................... 354/289.1, 289.11, 354/289.12, 471, 472, 473, 474, 475; 345/38, 88, 104; 396/287, 291, 292

[56]             References Cited

U.S. PATENT DOCUMENTS 4,028,712  6/1977  Kawamura et al. ..................... 354/475
4,647,176  3/1987  Shimizu et al. ...................... 354/289.1
5,406,347  4/1995  Saegusa ............................. 354/289.1

FOREIGN PATENT DOCUMENTS 5-150304   6/1993   Japan .

*Primary Examiner*—A. A. Mathews

[57]            ABSTRACT

A multi-function camera having a display unit in which the different operational modes are displayed in different colors. The operational modes are controlled by manipulation members on the exterior surface of the camera. The manipulation members are color coordinated with the respective operational modes. As a result, a photographer can quickly consult the display unit to find out the operational mode that the multi-function camera is operating in. Furthermore, the color coordination also makes it easier for a photographer to set the multi-function camera in the proper operational mode.

15 Claims, 23 Drawing Sheets

FIG. 20

| SYMBOL | WINDING MODE |
|---|---|
| [ S ] | SINGLE SHOT |
| H | HIGH SPEED CONTINUOUS SHOOTING |
| L | LOW SPEED CONTINUOUS SHOOTING |
| S | SILENT CONTINUOUS SHOOTING (CONTINUOUS SHOOTING WITH WINDING SOUND SILENCED) |

FIG. 21

| SYMBOL | FOCUS AREA MODE |
|---|---|
| M F | MANUAL FOCUS |
| A F S | AUTO FOCUS S (SHUTTER BUTTON CAN BE PRESSED AFTER BEING FOCUSED) |
| A F C | AUTO FOCUS C (SHUTTER BUTTON CAN BE PRESSED EVEN IF NOT IN FOCUS) |

| SYMBOL | APPEARANCE OF DISPLAY | EXPOSURE MODE |
|---|---|---|
| P | P | PROGRAM |
| S | S | SPEED PRIORITY |
| A | A | APERTURE PRIORITY |
| M | M | MANUAL |
| P* | P* | PROGRAM SHIFT (MODE WHICH DEVIATES FROM THE PROGRAM LINE DIAGRAM) |

FIG. 24

| SYMBOL | STROBE MODE |
|---|---|
| ⚡👁 | RED EYE REDUCTION FLASH |
| ⚡SLOW | SLOW SYNCHRO |
| ⚡REAR | REAR SHUTTER BLIND SYNCHRO |
| ⚡ | FRONT SHUTTER BLIND SYNCHRO |

FIG. 25

| SYMBOL | DISPLAY APPEARANCE | ADDRESS OF QUICK RECALL MODE |
|---|---|---|
| 0 | 0 | ADDRESS NOT STORED IN MEMORY |
| 1 ⋛ 8 | 1 ⋛ 8 | ADDRESSES WHICH ARE STORED IN MEMORY (TOTAL OF 8) |
| 9 | 9 | INITIALIZATION ADDRESS (RETURNS TO THE INITIAL SETTINGS OF THE CAMERA) |

FIG. 26

| SYMBOL | DISPLAY APPEARANCE | ADDRESS OF QUICK RECALL MODE |
|---|---|---|
| 0 | ᴏ | ADDRESS WHICH IS NOT CALLED |
| 1 ⟨ 8 | 1 ⟨ 8 | ADDRESSES WHICH ARE CALLED |
| 9 | 9 | INITIALIZATION ADDRESS |

FIG. 27

| SYMBOL | FOCUS AREA SETTINGS |
|---|---|
| [ ] | WIDE AF |
| o | SPOT AF |

MULTI-FUNCTION CAMERA HAVING COLOR COORDINATED OPERATIONAL MODES AND MANIPULATION MEMBERS

This application is a continuation of application Ser. No. 08/389,163, filed Feb. 15, 1995, now abandoned.

BACKGROUND OF THE INVENTION

1. Field of the Invention

The present invention is related to a multi-function camera having multiple operational modes in which the contents of the respective operational modes can be modified, and, more particularly, to a camera having an improved display panel for displaying the contents of the respective operational modes and improved switches for selecting the operational modes.

2. Description of the Related Art

Most cameras produced today are programmed so that they can operate in many different modes. If a photographer would like the camera to function in a particular capacity then he would adjust a control setting on the camera so that the camera would operate in the desired capacity.

The following list contains examples of the different kinds of modes in which cameras function: film sensitivity modes, focus area setting modes, light measurement mode settings, exposure mode settings, image program settings, amount of exposure correction settings, film feed mode settings, self timer settings, and speed light photographic synchro mode settings.

Furthermore, each of the above listed operational modes contain operational selections. For example, the film sensitivity mode contains two operational selections: a automatic setting and a manual setting. In the focus area settings mode, there are selections in which the photographer is to specify the regions in which automatic focusing is to be conducted. In the light measurement mode, there are the following operational selections: a light measurement selection for multiple areas, light measurement selection emphasizing the central part of the subject, and a spot light measurement selection. In the exposure mode setting, there are the following operational mode selections: a program shutter selection, a shutter priority automatic selection, an exposure priority automatic selection and a manual selection. In the amount of exposure correction setting, there are several operational mode selections including ± codes. In the film feed mode setting, there are the following operation mode selections: single frame winding, low speed continuous winding, and high speed continuous winding. Similarly, the above described image program setting, self timer setting, and speed light photography synchro mode setting, each have there own operational mode selections.

The setting of the operational modes and the setting of the operational mode selections is accomplished by entering information relating to the operational modes into the camera. The information is input via manipulating manipulation members that are located on the external surface of the camera body. The manipulation members are switches that control the selection of the various operating modes and respective operating mode selections. Due to the large number of operating modes, it is impossible to provide a separate switch for each operating mode. There is not enough space on the surface of the camera to accommodate such a large number of switches. Japanese Patent Publication No. 02-68510 teaches a mode selection system in which relatively few switches can regulate the selection of a vast number of operational modes and the operational selections within the modes.

It is also known to use push button switches in conjunction with command dials to reduce the number of switches needed to select the several different operational modes. For example, if a push button switch is depressed while the command dial is rotated, then this will cause the several different operational modes to be displayed on a display panel positioned. When the desired option is displayed on the display panel the push button is released and the displayed option is selected. This type of configuration reduces the number of switches needed to select the numerous operational modes.

When setting the various operational modes, it is often necessary to confirm the contents of that setting. Therefore, a display panel for displaying the contents of the operational mode is provided on the camera body. However, there are very few locations on the camera body where there is enough room to accommodate the display panel. As a result, the display panel must be small enough to fit in a confined area but big enough to display the contents of the many operational modes.

One of the problems with the prior art display panels is that there is a vast amount of information displayed on a limited space. As a result, it is difficult for a photographer to quickly consult the display panel and determine if he is in the proper operational mode. Another problem with the prior an display panels is that the switches that govern the operational modes that are displayed on the display panels are not positioned near the display panel. As a result, it is difficult to look at the switch and the display panel at the same time. Furthermore, because there is a vast amount of information displayed on the display panel, it is very difficult to find the position on the display panel that corresponds with the operational mode that is being commanded by the switches. Moreover, inexperienced photographers often find it very difficult to set the proper operational mode and feel insecure about whether there in the correct operational mode. For these and other reasons, it is desirable to simplify the mode setting procedure.

SUMMARY OF THE INVENTION

Accordingly, it is an object of the present invention to provide a multi-function camera having a display unit which is easy to read.

It is another object of the present invention to provide a multi-function camera which is easy to program.

It is yet another object of the present invention to provide a multi-function camera which has switches positioned next to the display unit.

It is another object of the present invention to provide a multi-function camera in which the operational modes are displayed on the display unit in different colors.

It is another object of the present invention to provide a multi-function camera in which the operational mode is clearly depicted on the display unit.

Additional objects and advantages of the invention will be set forth in part in the description which follows, and, in part, will obvious from the description, or may be learned by practice of the invention.

Objects of the present invention are achieved by providing a camera having a plurality of operational modes which are individually selectable, the camera comprising a display unit having a plurality of colors which respectively correspond to the plurality of operational modes, the display unit displaying a respective color when the corresponding operational mode is selected.

Objects of the present invention are also be achieved by providing a camera having a plurality of operational modes which are individually selectable, the camera comprising a display unit having a plurality of colors which respectively correspond to the plurality of operational modes, the display unit displaying a respective color when the corresponding operational mode is selected, and a plurality of switches positioned on an exterior surface of the camera.

Objects of the present invention are further achieved by providing a camera having a plurality of operational modes which are individually selectable, the camera comprising a first display unit having a plurality of colors which respectively correspond to the plurality of operational modes, the display unit displaying a respective color when the corresponding operational mode is selected, a plurality of switches positioned on an exterior surface of the camera, and a second display unit positioned on a back cover of the camera.

Objects of the present invention are further achieved by providing a camera comprising switches that are color coordinated with the operational modes being displayed on the display unit.

BRIEF DESCRIPTION OF THE DRAWINGS

These and other objects and advantages of the invention will become apparent and more readily appreciated from the following description of the preferred embodiments, taken in conjunction with the accompanying drawings of which:

FIG. 20 is a diagram illustrating the contents that can be set in a winding mode and display symbols corresponding to the various winding modes of a camera in accordance with the fourth embodiment of the present invention.

FIG. 21 is a diagram illustrating the contents that can be set in the focus area mode and the display symbols corresponding to the various focus area modes of a camera in accordance with the fourth embodiment of the present invention.

FIG. 24 is a diagram illustrating the contents that can be set in a strobe mode and the display symbols corresponding to the various strobe mode settings of a camera of the fourth embodiment of the present invention.

FIG. 25 is a diagram illustrating the contents that can be set during the quick recall mode and the display numerals corresponding to various quick recall mode settings of a camera in accordance with the fourth embodiment of the present invention.

FIG. 26 is a diagram illustrating the contents that can be read during the quick recall mode and the display symbols corresponding to the various quick recall mode settings of a camera in accordance with the fourth embodiment of the present invention.

FIG. 27 is a diagram illustrating the contents that can be set in the focus area setting mode and the display symbols corresponding to the various focus area setting modes of a camera in accordance with the fourth embodiment of the present invention.

DESCRIPTION OF THE PREFERRED EMBODIMENTS

Figure 1:
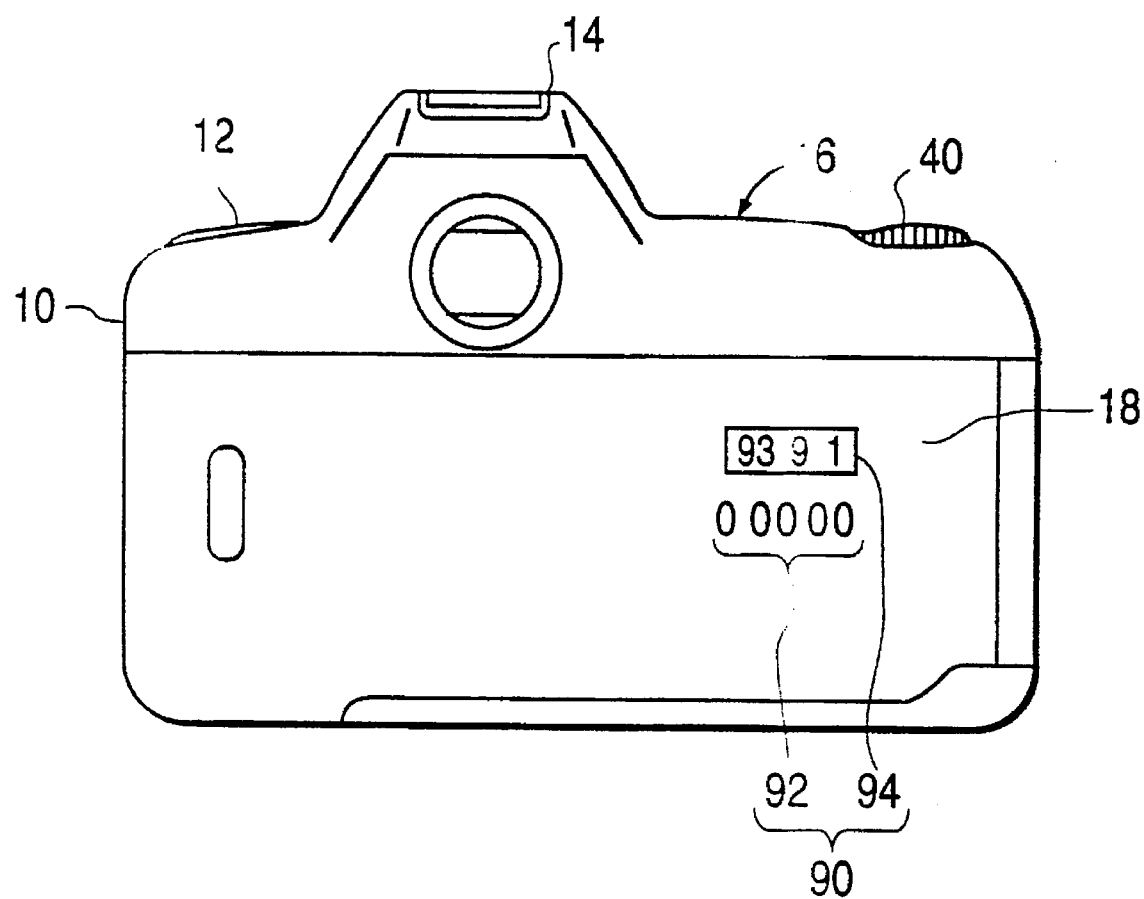
FIG. 1 is a rear view of a camera in accordance with a first embodiment of the present invention.

Reference will now be made in detail to the present preferred embodiments of the present invention, examples of which are illustrated in the accompanying drawings, wherein like reference numerals refer to like elements throughout.

FIG. 1 shows a back side of a camera in accordance with a first preferred embodiment of the present invention. The back side of the camera comprises a camera body 10, a finder 14, a left top surface 12, a right top surface 16 and a back cover 18. The right top surface has contains a command input section 40. A date display section 90 is positioned on the back cover 18. The camera has multiple operational modes. Operation members are positioned on the fight and left top surfaces 12, 16 for activating the respective operational modes. The date display section 90 includes a display panel 94 and a date set button 92.

Figure 2:
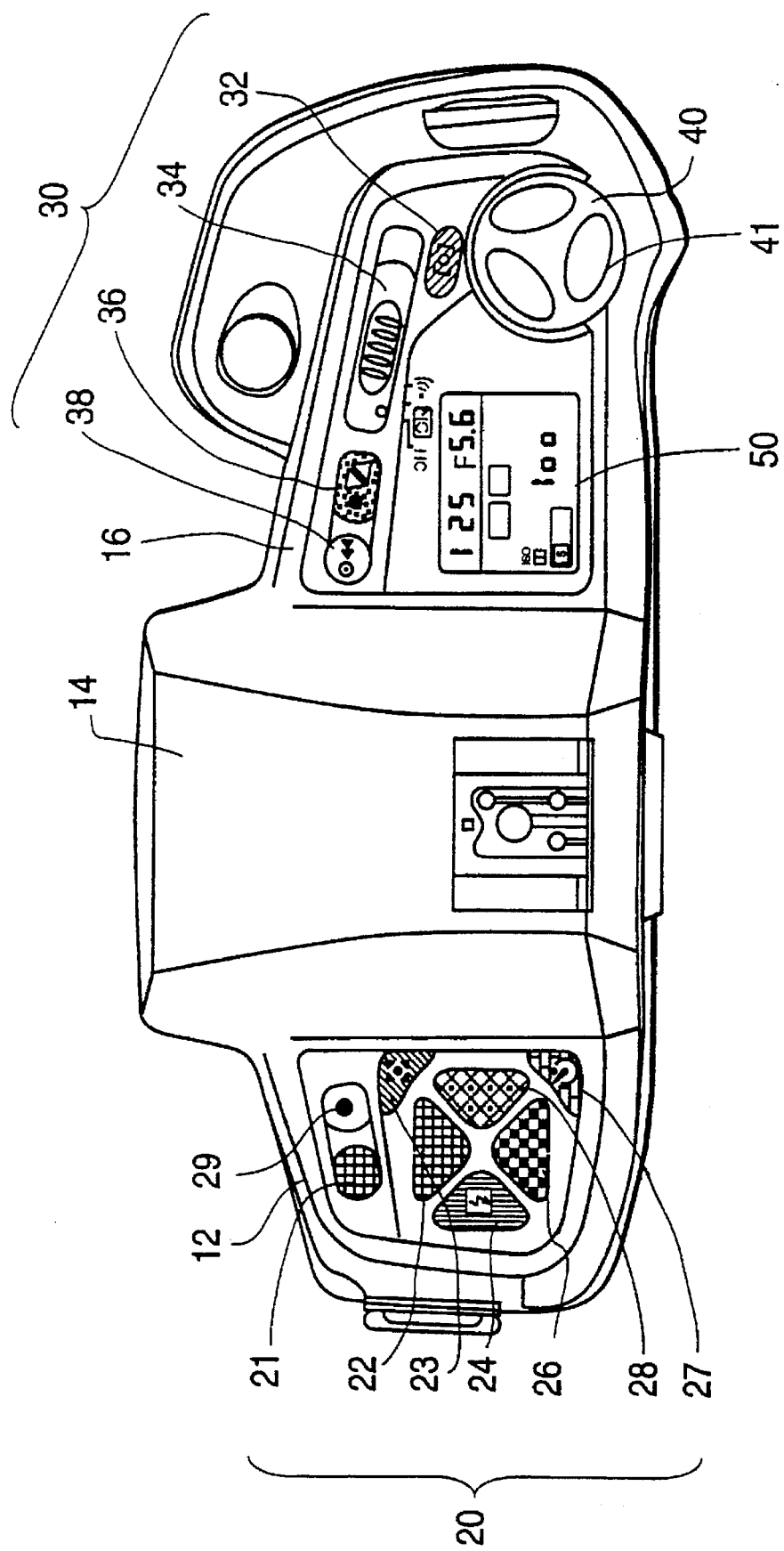
FIG. 2 is a top view of a camera in accordance with a first embodiment of the present invention.

FIG. 2 shows a top view of a camera in accordance with the first embodiment of the present invention. The left and right top surfaces 12, 16 of the camera body 10 contain switches that set the operational modes of the camera. A first mode set section 20 is positioned on the top left surface 12. The first mode set section includes an image program set switch 21, an exposure mode set switch 22, a light measurement mode switch 23, a synchro mode switch 24, a film feed mode switch 26, a film sensitivity rewind switch 28, a self timer switch 27, and a reset switch 29. The reset switch 29 is the only switch that is not a mode function setting switch for the purpose of specifying operational mode. These switches are configured as push button switches. Consequently, these switches may simply be called "buttons" (i.e. "a light exposure mode button"). Pushing any one of the mode switches causes a command input part 40 to instruct the camera function in the appropriate mode. When the camera starts to function in the appropriate mode, the switch is released. These switches are not limited to push button type switches. Different types of switches may be used. For example, touch switches would work equally as well. The switches also are not limited to hold-down push button switches. For example, the switches may be such that once pushed the switch maintains its status electrically or mechanically and when it is pushed again, the self retention state is released.

A second mode set section 30 is positioned on the top fight surface 16. The second mode section 30 includes a first display part 50, a focus area selection switch 32, a main switch 34, an amount of exposure correction set switch 36, and a winding return switch 38. The focus area selection switch 32, the amount of exposure correction set switch 36 and the winding return switch 38 are all push button type switches. These switches may also be switches other than the push button type, and as with the above referenced switches positioned in the first mode set section 20, they may be switches which have a self retention function.

The focus area selection switch 32 and the amount of exposure correction set switch 36 also function as mode specification means for the purpose of specifying operational modes. Pushing these switches causes the command input part 40 to instruct the camera in the appropriate mode. Once the camera starts to act in accordance with the appropriate mode, the corresponding switch is released.

The main switch 34 is a slide switch. It would be possible to substitute a different type of switch for the slide switch; for example, a push button switch. The main switch 34 functions as the power ON/OFF switch.

As will be described later and as embodied herein, all of the above referenced switches are of different colors. Each color corresponds to a particular section on the first display part 50.

The first command input pan 40 functions as the mode content set means for the purpose of setting the respective contents of the specified operational mode. The first command input part 40 contains a dial type pulse generator 41 and a counter. The first command input part outputs a pulses every time the dial type pulse generator 41 rotates a fixed amount (not indicated in the diagram).

The command input part 40 is not limited to the above described structure. For example, a push button type pulse generator could be used instead of a dial type pulse generator 41. If a push button type pulse generator is used, then each time the button is pressed a pulse is output and the count is made to increase.

The first display part 50 is configured to have a panel display. The details of display part 50 will be described later. In general, the display part 50 can display information in partial specific colors. For example, a liquid crystal display, or an emission diode display can be employed as pulse type display devices. Moreover, color liquid crystal displays, color filters combined with liquid crystal displays, and emission diode panels which utilize multiple color emission diode elements can be employed as panel type display devices. These devices make it possible to display partial specific colors. In addition, either reflective type or transparent type liquid crystal displays may be used.

Figure 3:
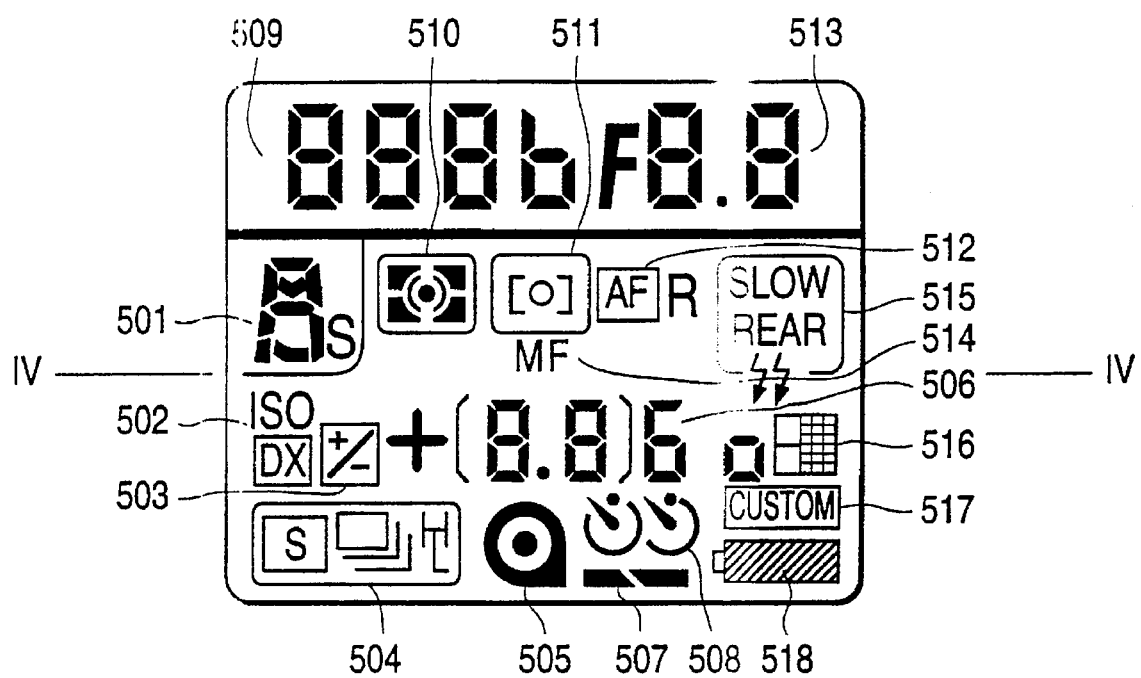
FIG. 3 is a top view of a display part of the camera in accordance with a first embodiment of a camera of the present invention.

FIG. 3 is a diagram of the display part 50 and illustrates the following display areas within its display screen: an exposure mode display part 501, a film sensitivity set mode display pan 502, an exposure correction mark display 503, a film feed mode display pan 504, a film present mark display part 505, a numeric value display part 506, a film feed display part 507, a self-timer set display part 508, a shutter speed display part 509, a light measurement mode display part 510, a focus area display part 511, a focus priority/release priority display part 512, an aperture value display part 513, a manual focus display part 514, a synchro mode display part 515, an optional function display pan 516, a custom set display part 517, and a battery check display part 518.

The numeric value display part 506 is a region for the purpose of displaying numerical values, codes and characters for modes which require such a display. In accordance with the first preferred embodiment of the present invention, the film counter which displays the number of film frames, the exposure correction value, the self-timer time in seconds, the contents of the image program, and the film sensitivity are displayed when the corresponding mode is selected.

Figure 4:
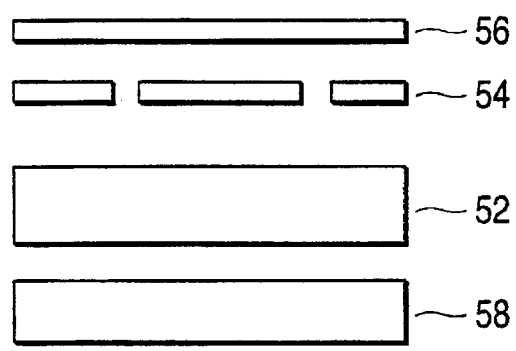
FIG. 4 is a cross sectional diagram of the display part of FIG. 3 taken along line IV—IV in accordance with a first embodiment of the present invention.

FIG. 4 shows a cross sectional view of the display part 50 along line IV—IV of FIG. 3. The display part 50 includes a liquid crystal panel 52, color filters 54, protective glass 56 and a back light source 58. The color filters are arranged in local areas on the front surface of the panel 52. The protective glass 56 is positioned on top of the color filters 54 and the back light source 58 is positioned below the liquid crystal panel 52. The liquid crystal panel 52 includes a liquid crystal cell layer (not shown in the diagram) and polarization plates (not shown in the diagram). The liquid crystal cell layer includes transparent electrode parts placed on both of its surfaces. The polarization plates are respectively positioned on the front and back surfaces of the liquid crystal cell layer. In particular, FIG. 4 shows a transparent type liquid crystal panel 52 combined with color filters 54. The liquid crystal panel 52 is combined with color filters 54 so that each mode can be displayed in its own color while employing only one back light source 58. As a result, a color divided display can be made with an inexpensive monochrome liquid crystal panel, and the drive circuit (not indicated in the diagram) of display part 50 can be made simple.

Figure 5:
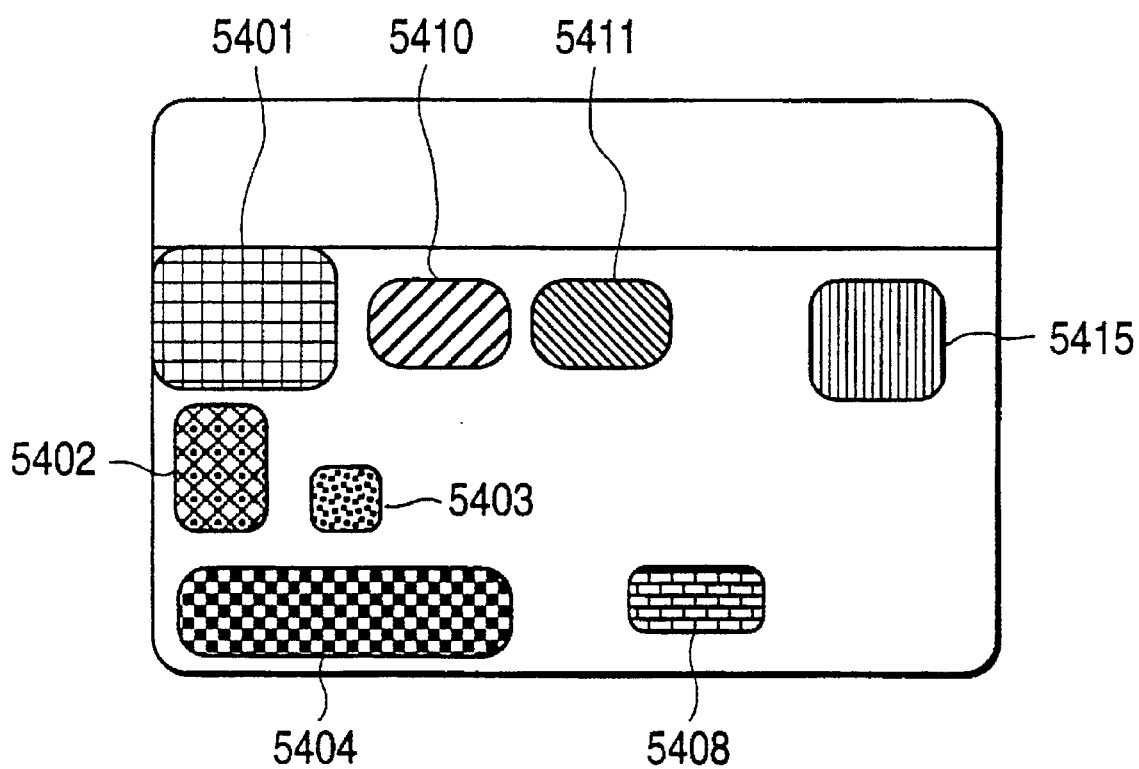
FIG. 5 is a diagram illustrating the arrangement of color filters on the display part of FIG. 3 in accordance with the first embodiment of the present invention.

FIG. 5 is a top view of the first display panel 50 and shows the arrangement of the color filters 54 in their respective positions. An exposure mode display filter 5401 is arranged in the region of exposure mode display part 501. A film sensitivity set mode display filter 5402 is arranged in the region of film sensitivity set mode display part 502. An exposure control mark display filter 5403 is arranged in the region of exposure correction mark display part 503. A film feed mode display filter 5404 is arranged in the region of film feed mode display part 504. A self-timer set display filter 5408 is arranged in the region of self-timer set display part 508. A light measurement mode display filter 5410 is arranged in the region of light measurement mode display part 510. A focus area display filter 5411 is arranged in the region of focus area display part 511. A synchro mode display filter 5415 is arranged in the region of synchro mode display part 515.

The filters 5401, 5402, 5404, 5408 5410, 5411, and 5415 each have a different color. The optical characteristics of these filters are selected such that the display color is the same as that associated with the switch corresponding to that function. The corresponding relationship between the color filters 54 and the switches is as follows.

The exposure mode display filter 5401 corresponds with the image program set switch 21 and exposure mode set switch 22. The film sensitivity set mode display filter 5402 corresponds with the film sensitivity/rewind switch 28. The exposure correction mark display filter 5403 corresponds with the amount of exposure correction set switch 36. The film feed mode display filter 5404 corresponds with fill the feed mode switch 26. The self timer set display filter 5408 corresponds with the self-timer switch 27. The light measurement mode display filter 5410 corresponds with the light measurement mode switch 23. The focus area display filter 5411 corresponds with the focus area selection switch 32. The synchro mode display filter 5415 corresponds with the synchro mode switch 24.

Consequently, the switch that controls the mode in which the camera is operating and the display region that indicates the mode the camera is operating are the same color. By positioning the color filters 54 on the front surface of liquid crystal panel 52, the color of that region can be seen even when there is no display state. Therefore, when a photographer is manipulating a switch he can be relatively confident that the camera is being set properly. In addition, color filters 54 may be arranged at other positions on the first display panel 50.

As shown in FIG. 2, the top surfaces of the mode setting switches 21, 22, 23, 24, 26, 27 and 29 are assigned a specific color. The color divided display is not limited to the color schemes shown in the diagrams. It may also be executed in other forms that are visually recognized. For example, the entire switch of the respective switches may be colored with the corresponding color, corresponding colors may be added to one part of the button, a pattern utilizing the corresponding color (for example, rings, dots, stars, asterisks, or other patterns) may be placed on the switches, or characters that are recorded on the button may be printed in the corresponding color. As shown in FIG. 2 and FIG. 5, color is indicated by hash marks on the surface of the buttons. Moreover, the symbols attached to each button can be the same as the symbols which are displayed on display part 50.

The mode setting operation will be explained in accordance with the first preferred embodiment of the present invention.

First, the main switch 34 must be placed in the ON position. This may cause a warning operation to be activated. If the warning operation is activated, then the limit values for previously set operational modes are either too high or too low and in need of adjustment. The warning operation is indicated by a flashing light within the finder 14.

Next, the kinds of settings necessary for photography are executed. In the present embodiment, explanations will be given for the following: setting the film sensitivity, setting the focus area, setting the light measurement mode, setting the exposure mode, setting the image program, setting the amount of exposure correction, setting the film feed mode, setting the self-timer mode, and setting the speed light. In addition, it goes without saying that the mode settings are not limited to those listed above.

The film sensitivity setting is adjusted by rotating the dial type pulse generator 41 (hereinafter called the "command dial 41 ")while pressing the film sensitivity/rewind switch 28. This will cause either an automatic setting (DX), or the numerical values of the previously set film sensitivities (ISO) to be displayed on the display panel 50. Usually, DX appears as the standard selection choice. If the film sensitivity/rewind switch 28 is released while DX is displayed in the display part 50 then the DX is selected. As a result, "DX" is displayed on film sensitivity set mode display part 502. It is important to note that the display is shown in the same color as the top surface of film sensitivity/rewind switch 28 because of filter 5402. Similarly, if an ISO numerical value is selected by turning command dial 41, "ISO" is displayed on film sensitivity set mode display part 502, as shown in FIG. 3, and the previously set film sensitivities are displayed. If the film sensitivity/rewind switch 28 is released while "ISO" is displayed, then "ISO" is selected.

The focus area setting is adjusted by rotating command dial 41 while pressing down focus area selection switch 32. This causes the previously set codes to be displayed on focus area display part 511 in the same color as the top surface of the corresponding switch 32, as shown in FIG. 3. In the present embodiment, a wide focus area or a spot focus area may be selected.

The light measurement setting is adjusted by rotating command dial 41 while pressing down light measurement mode switch 23. This causes the following options to be displayed; full area multiple points (multi-pattern), light measurement emphasizing the central part, or spot light measurement. The light measurement settings are displayed on first display part 50 in the light measurement mode display 510 in the same color as light measurement mode switch 23.

The exposure mode is adjusted by rotating the command dial 41 while pressing down exposure mode set switch 22. This will cause the following option to appear in the exposure mode display 501: a multi-program (P), a shutter priority automatic (S), an aperture priority automatic (A), or a manual exposure (M).

The image program is adjusted by rotating the command dial 41 while pressing down the image program set switch 21. This will cause the code "Ps" to be displayed in the exposure mode display 501. "Ps" indicates that the camera is in the image program mode. Furthermore, the contents of the image program are displayed on the numeric value display part 506. The image program mode includes the following options: portrait (Po), landscape (LR), silhouette (SL), sports (SP), and close up (CU).

The amount of exposure correction setting is adjusted by rotating the command dial 41 while pushing down the amount of exposure correction set switch 36. This causes a ±/code to be displayed on the exposure correction mark display part 503 in the same color as the color of amount of exposure correction set switch 36. Furthermore, the numerical value of the amount of correction is displayed on numerical value display part 506.

The film feed mode setting is set by rotating command dial 41 while pressing down the film feed mode switch 26. The rotation of command dial 41 causes the following information to be displayed in the film feed mode display 504: one frame winding, low speed continuous winding, and high speed continuous winding. The color of the information displayed on the film feed mode display part 504 is the same color as film feed mode switch 26.

The self-timer setting is adjusted by rotating command dial 41 while pressing down self-timer switch 27. The rotation of command dial 41 causes the following information to be displayed in the self-timer set/display part 508: one frame shot or two frame shots. Moreover, the numerical value of the operational time is displayed on numerical value display part 506. The information displayed in self-timer set/display part 508 is in the same color as self timer switch 27.

The speed light photography synchro mode setting is adjusted by rotating command dial 41 while pressing down synchro mode switch 24. The rotation of command dial 41 causes the following speed light photography synchro setting selections to be displayed on the synchro mode display part 515: front blind synchro, slow synchro, rear blind synchro, and red eye reduction flash. The above identified selections are displayed on synchro mode display part 515 in the same color as synchro mode switch 24.

In accordance with the first embodiment of the present invention, each of the switches is assigned its own distinct color. Moreover, the regions in display part 50 depicting the mode the camera is operating in are in the same colors as the corresponding switches. Consequently, when setting modes, the setting contents can be accurately confirmed in a short period of time with a small margin of error. The following advantages can be realized by color coordinating the switches with the operational display mode: the operator's manual is made easier to understand, the handling procedures are easy to understand, and it is easier to remember which switch controls which operational mode. For example, an unskilled photographer can easily determine which switch belongs with which mode by looking at the display part that has the same color as the switch that is being manipulated. As a result, the photographer immediately knows the results of the manipulations.

Figure 6:
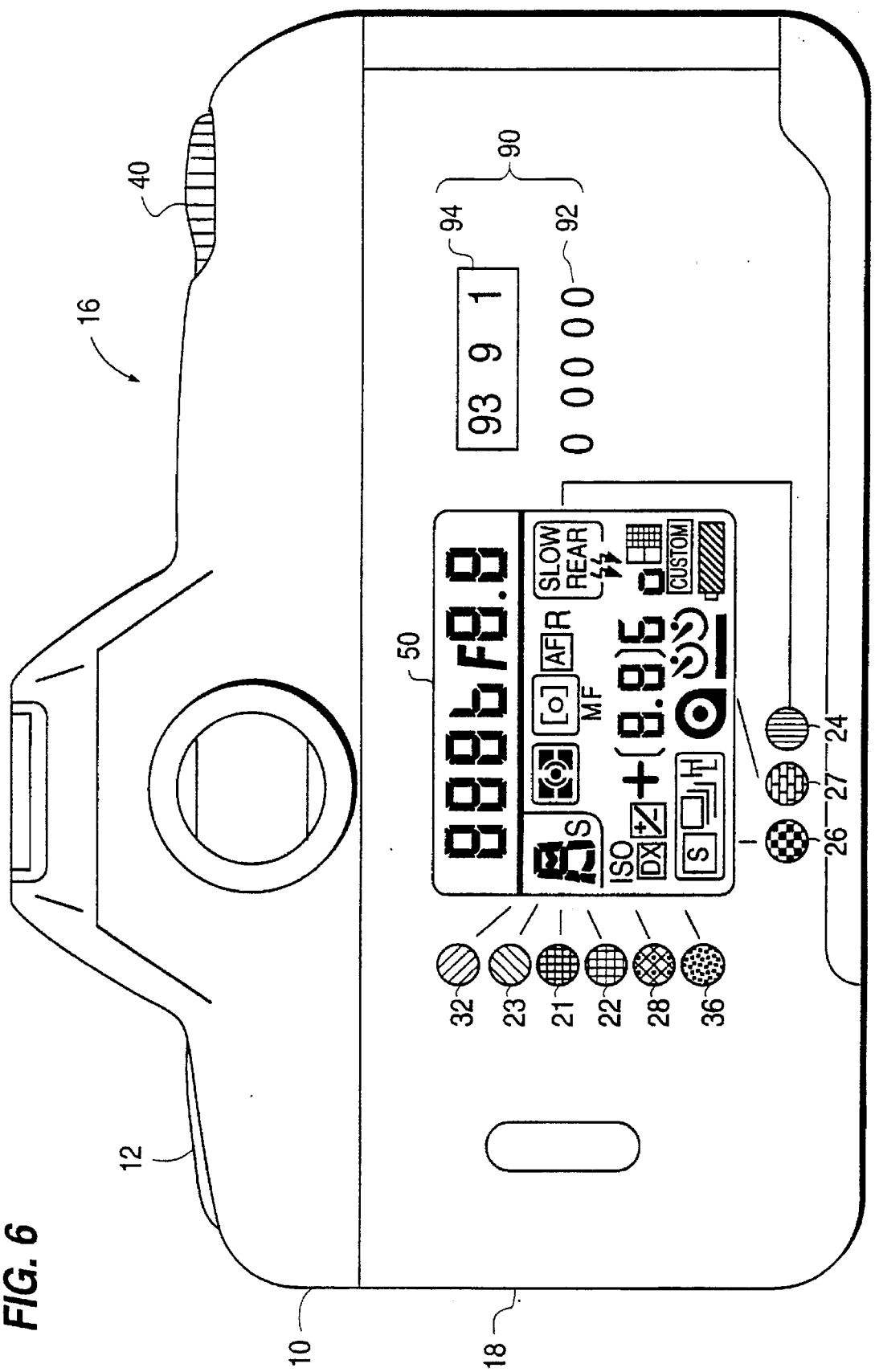
FIG. 6 is a rear view of a camera in accordance with a second embodiment of the present invention.

FIG. 6 is a rear view of a camera in accordance with a second preferred embodiment of the present invention. As shown in FIG. 6, the display part 50 and the various switches which comprise the mode specification means are arranged on the back cover 18. The date setting/display part 90 is arranged on back cover 18. The command dial 41 of command input part 40 is arranged on top right surface 16 of camera body 10. Display part 50 is configured in the same way as in the first preferred embodiment of the present invention. As a result, redundant explanations will be omitted.

The display part 50 has the following switches arranged around its outer periphery: a focus area selection switch 32, a light measurement mode switch 23, an image program set switch 21, an exposure mode switch 22, a film sensitivity/ rewind switch 28, an amount of exposure correction set switch 36, a film feed mode switch 26, a self timer switch 27, and a synchro mode switch 24. These switches are arranged in a counter clockwise order starting near the top left side of display part 50 and ending near the lower left side of display part 50. The switches are arranged on the left side of the display part 50 so that a photographer can rotate the command dial 41 with his right hand while manipulating the switches with his left hand. As in the first preferred embodiment, the above identified mode switches are color coordinated with the respective operational display mode sections.

Figure 7:
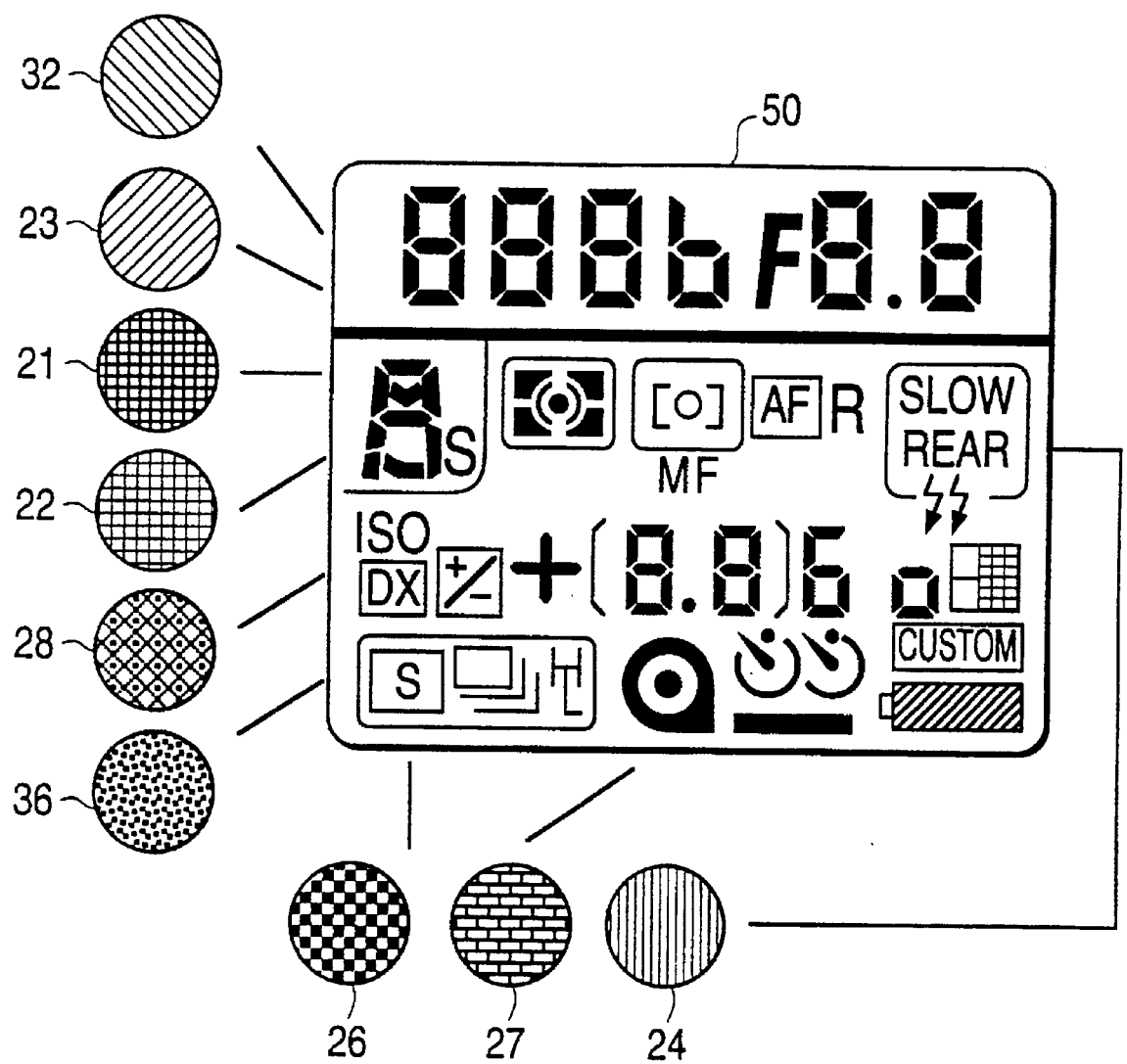
FIG. 7 is a diagram illustrating mode setting parts and display pans of a camera in accordance with a second embodiment of the present invention.

FIG. 7 is a diagram showing an enlargement of display part 50 and the switches as shown in FIG. 6. The information displayed in the different regions of the display part 50 is displayed in the same color as the switches. In FIGS. 6 and 7, the colors are depicted as cross hatches. In addition, this color division is accomplished by using the color filters 54 indicated in FIG. 4. As with the first preferred embodiment, this color coordination scheme enables a photographer to accurately confirm the mode setting contents in a short period of time.

In addition, the switches are arranged by placing them in close proximity to their corresponding display parts. Consequently, it is easy to view the display region while setting an operational mode. Additionally, while as embodied herein, the switches are push button type switches, it is important to note that any other type switch could be substituted for push button type switches. Furthermore, the switches operate in the same manner as in the first preferred embodiment of the present invention. The location of the switches differ in the second embodiment.

In the second preferred embodiment of the present invention, the switches that specify modes are provided on back cover 18 and other switches are provided on the top surface of camera body 10 in the same manner as in the first preferred embodiment. The switches operate in the same manner on the top surface as they do on the back cover 18.

Figure 8:
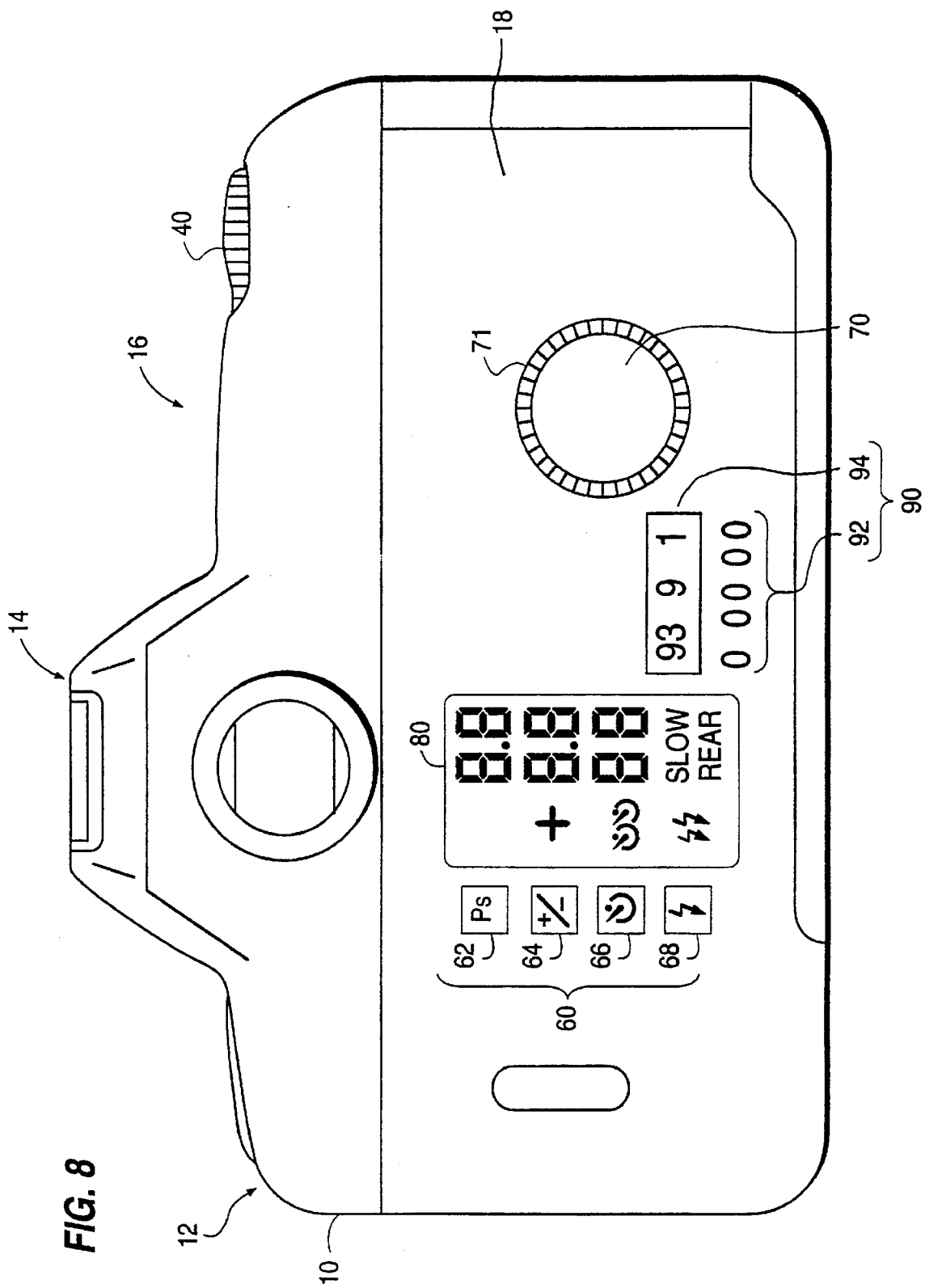
FIG. 8 is rear area view of a camera in accordance with a third embodiment of the present invention.
Figure 9:
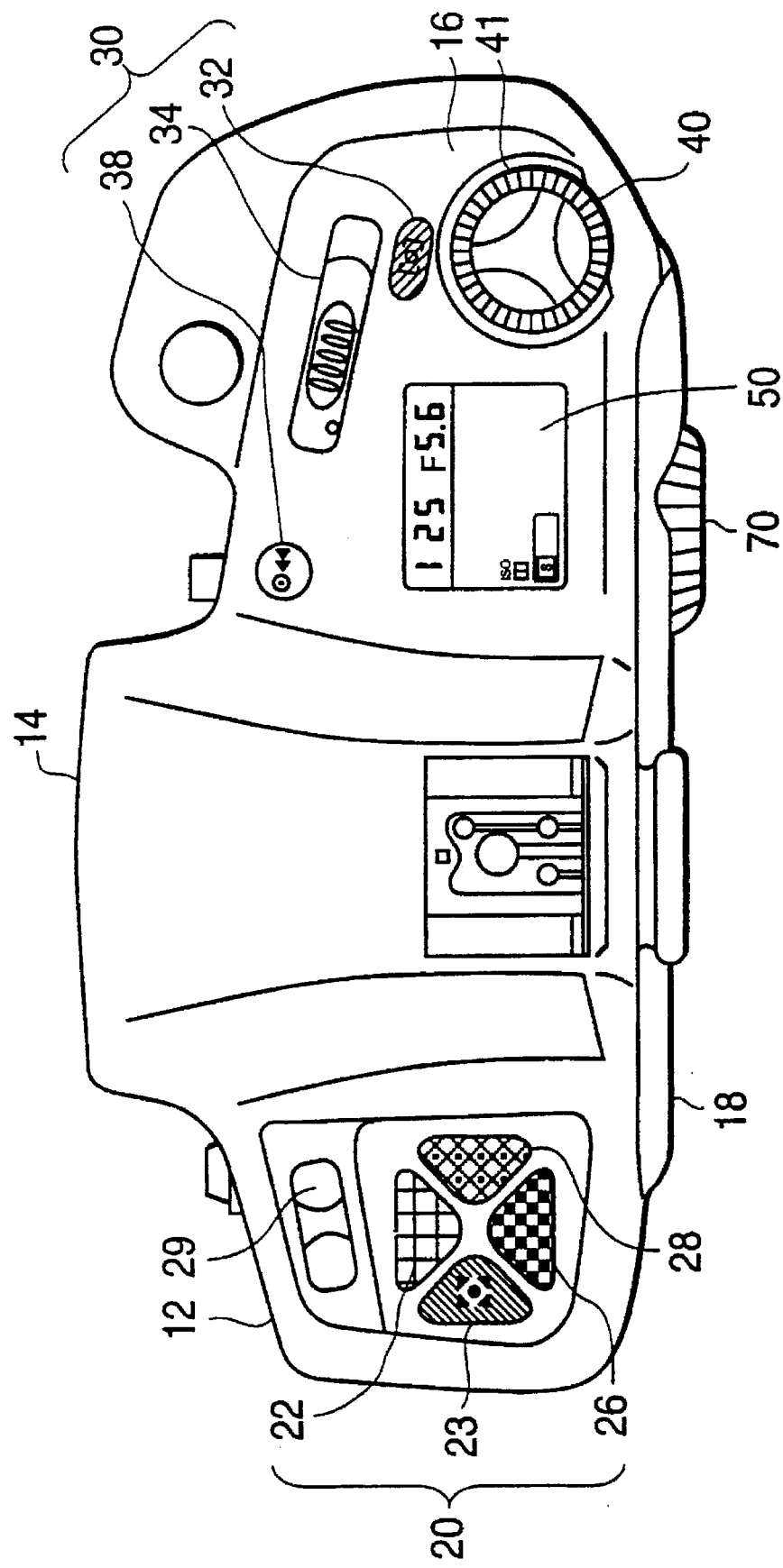
FIG. 9 is a top view of a camera in accordance with a third embodiment of the present invention.

FIGS. 8 and 9 show a camera in accordance with a third preferred embodiment of the present invention. As shown in FIGS. 8 and 9, manipulation members and display parts are arranged on the top surface and the back cover 18 of the camera body 10. Specifically, as indicated in FIG. 9, a first mode set part 20 is positioned on the top left surface of camera body 10. A second mode set part 30, a first command input part 40 and first display part 50 are positioned on a top right surface of camera body 10. As shown in FIG. 8, a third mode set part 60, a second command input part 70, a second display part 80, and date setting/display part 90 are positioned on the back cover 18 of camera body 10 in accordance with the third preferred embodiment of the present invention.

The mode setting parts and display parts of the third embodiment are structured and function in the same manner as described in the first and second embodiments of the present invention. This embodiment differs from the first two preferred embodiments in that the display parts and mode setting parts are positioned on the top surface and back cover 18 of the camera body 10. Consequently, the explanation of the third preferred embodiment will focus on the points that are different.

As shown in FIG. 9, an exposure mode set switch 22, a light measurement mode switch 23, a film feed mode switch 26, a film sensitivity/rewind switch 28, and a reset switch 29 are arranged in the first mode set part 20. The second mode set part 30 comprises a focus area selection switch 32, a main switch 34 and a rewind switch 38.

As shown in FIG. 8, a third mode set part 60 includes an image program set switch 62 (21), an amount of exposure correction set switch 64 (36), a self-timer switch 66 (27), and a synchro mode switch 68 (24). The switches of this third mode set part 60 are configured as push button switches in the same way as the switches of the first mode set part above. However, other type of switches could be substituted for the push button type switches. In addition, the numbers in parentheses indicate the switches corresponding to those provided on the top surface in the first preferred embodiment of the present invention. The switches of the third preferred embodiment function in the same manner as the switches in the first preferred embodiment. In order to adjust the operational mode of the camera in accordance with the third preferred embodiment of the present invention, a command dial 71 of the second command input part 70 must be rotated while holding down one of the following operational mode switches: the image program set switch 62, the amount of exposure correction set switch 64, the self-timer switch 66 and the synchro mode switch 68. This is very similar to the mode setting operation described in the first preferred embodiment of the present invention. The details of mode setting operation can be found in the explanation concerning the first preferred embodiment of the present invention. Since the switches of the first mode set part 20 and the second mode set part 30 are configured and function in the same manner as the switches indicated by the same reference numerals in the first preferred embodiment, a detailed explanation of the functions will be omitted.

Furthermore, the switches of the first mode set part 20 and the second mode set part 30 that are used for mode setting are the exposure mode set switch 22, the light measurement mode switch 23, the film feed mode switch 26, the film sensitivity/rewind switch 28, and the focus area selection switch 32. As in the first preferred embodiment, specific colors are associated with each of the switches. Furthermore, the color of each switch respectively corresponds with the color of a specific division or section of display part 50. The switches shown in FIG. 9 having cross hatches are the switches that have been designated specific colors.

The first display part 50 comprises a liquid crystal display and color filters. The liquid crystal display is a transparent type liquid crystal display in a preferred embodiment of the present invention.

Figure 10:
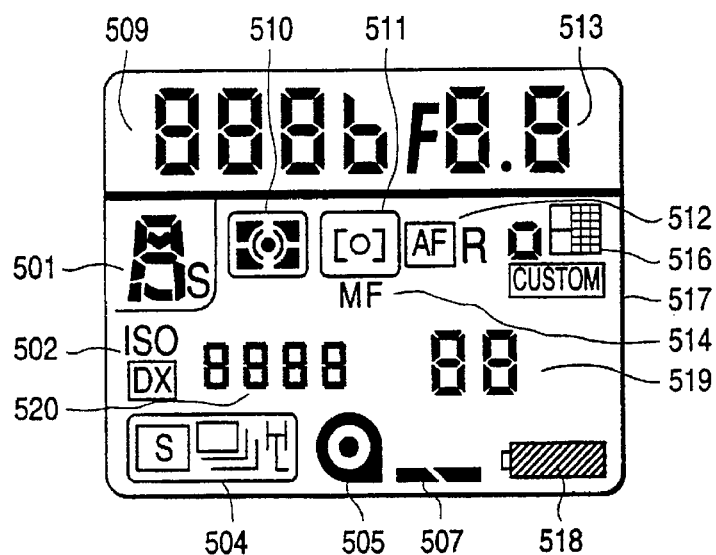
FIG. 10 is a diagram illustrating a first display part of a camera in accordance with a third embodiment of the present invention.

FIG. 10 is a diagram showing an enlargement of the display part 50 for the third embodiment. The display part 50 comprises the following display regions: an exposure mode display part 501, a fill sensitivity set mode display part 502, a film sensitivity display part 520, a film feed mode display part 504, a film present mark display part 505, a film feed display part 507, a shutter speed display part 509, a light measurement mode display part 510, a focus area display part 511, a focus priority/release priority display part 512, an aperture value display part 513, a manual focus display part 514, an optional function display part 516, a custom set display part 517, a battery check display part 518 and a film counter display part 519. The film sensitivity display part 520 is different from the film sensitivity display part in the first embodiment because a custom display region is provided. In the first preferred embodiment, all the numerical values were displayed on a numerical display part 506. Similarly, the film counter display part 519 is a custom display area. The other numerical values are displayed on a second display part 80 to be described later.

Figure 11:
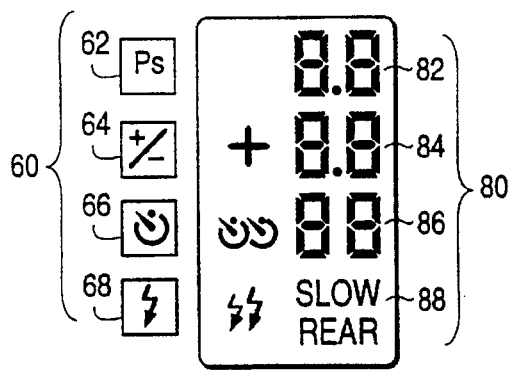
FIG. 11 is a diagram illustrating a second display part of a camera in accordance with a third embodiment of the present invention.

FIG. 11 is a diagram showing an enlarged second display part 80. The second display part 80 is configured as a panel type display, in particular, a liquid crystal display. As shown in FIG. 11, the switches of third mode set part 60 are positioned near the second display part 80. Furthermore, the switches of third mode set part 60 are positioned adjacent to the corresponding display area. As a result, it is easy to observe the display areas while manipulating the corresponding control switches of third mode set part 60. Moreover, there is no need to display the different display areas in different colors. It is important to note that there would be no hindrance if the display areas were displayed in different colors. If the display areas were exemplified in different colors, then it would be advantageous to have the corresponding switches displayed in the same color as the display area.

In the second display part 80, an image program display part 82 displays the setting contents of the image program and is positioned next to an image program set switch 62. An exposure correction mark display part 84 is positioned next to the amount of exposure correction set switch 64. A self-timer set display part 86 is positioned next to a self-timer switch 66. A synchro mode display part 88 is positioned next to a synchro mode switch 68. Each of the above described display parts can be adjusted by rotating the command dial 71 while pressing down the respective switches. The setting operation is the same as the operations explained in the first embodiment of the present invention.

Figure 12:
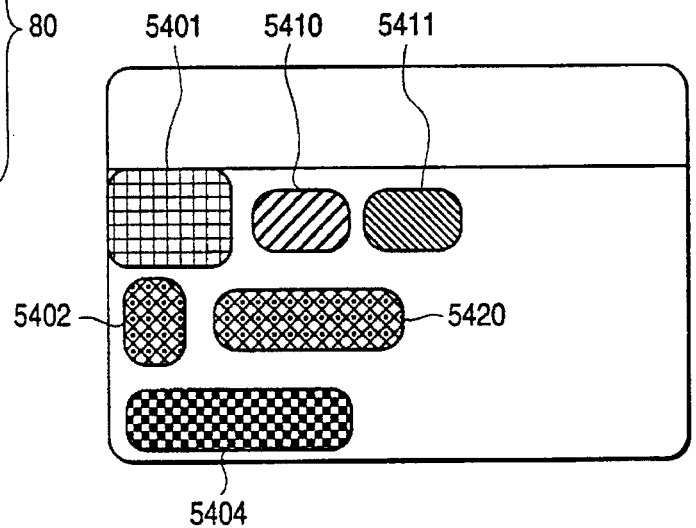
FIG. 12 is a diagram illustrating the arrangement of color filters on the first display part of FIG. 10 in accordance with the third embodiment of the present invention.

FIG. 12 illustrates five different color filters positioned at six different locations in display part 50. The different colors are represented by different cross hatches. The color filters 5401, 5402, 5404, 5410 and 5411 are the same as those in FIG. 5 and discussed in the first preferred embodiment of the present invention. The switches that control the functions that correspond with the display regions are also color divided in the same way as indicated in FIG. 9. It is important to note that filters 5403, 5408, and 5415 which are shown in FIG are not shown in FIG. 12. FIG. 12 shows filter 5420 instead of filters 5403, 5408 and 5415. Filter 5420 is the same color as filter 5402, and it is placed in the region reserved for the film sensitivity display part 520.

In the third embodiment, the switches and display parts are located on the top surface and the back cover 18 of the camera body 10. As a result, it is no longer necessary to position all the switches on the limited space available on the top surface of the camera body 10. The above described structure also makes it possible to provide more space in the display regions of the display part 50. Additionally, the ease of operation can be improved by providing more room between display areas on display part 50 and providing more room between display areas on display part 80.

The mode setting parts and display pans in the third embodiment are positioned on the back cover 18 instead of the top surface. As a result, information can be continued by distancing the eyes from the camera and glancing at the back cover 18. The information displayed on the back cover 18 is the information most frequently consulted during hand held photography. By contrast, in order to view the information displayed on the top surface, the camera must be lowered from the eyes so the top surface is visible. The information displayed on the top surface of the camera body 10 is easier to read when the camera is being used in conjunction with tripod.

Figure 13:
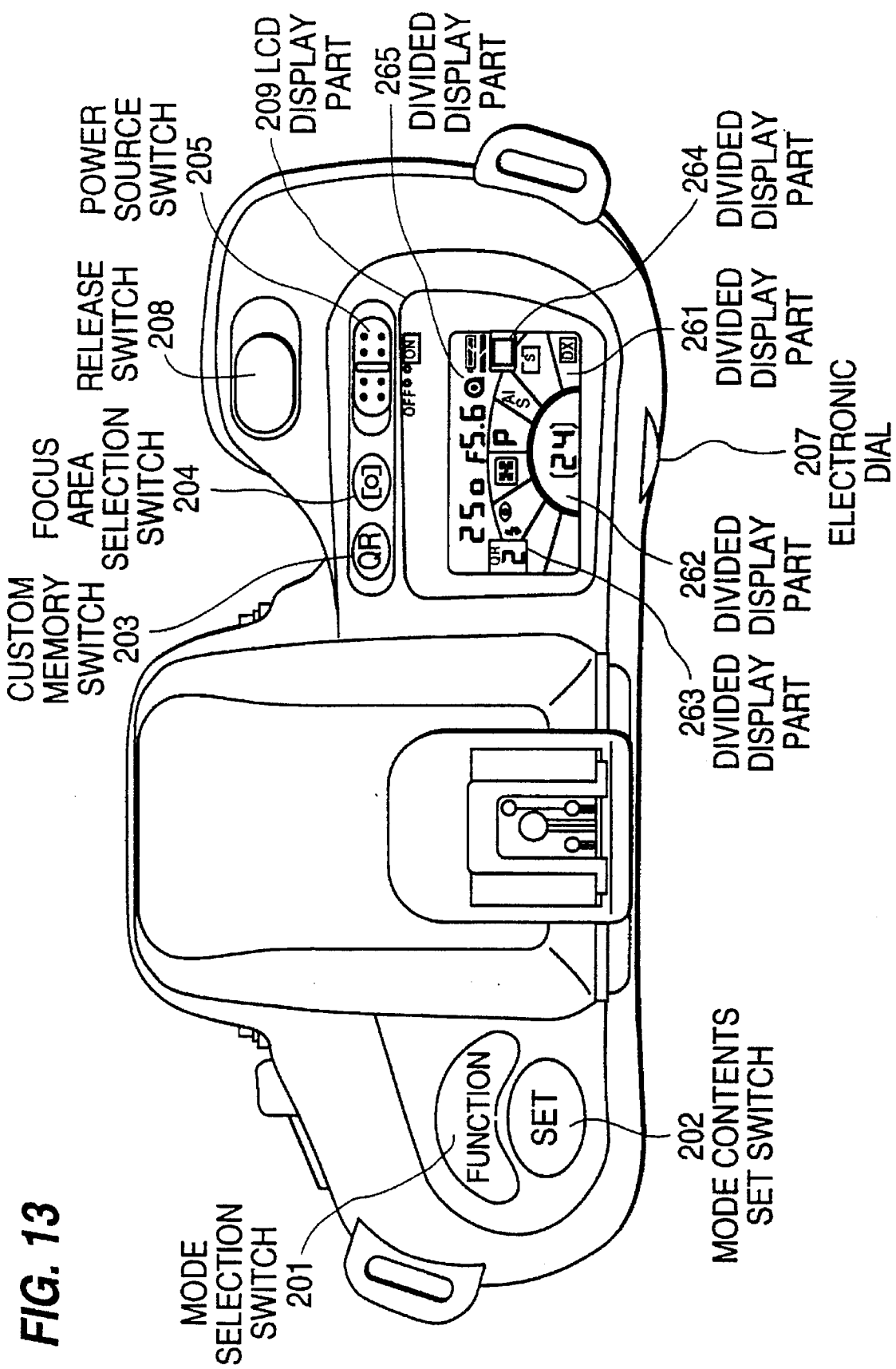
FIG. 13 is a top view of a camera in accordance with a fourth embodiment of the present invention.

FIG. 13 shows a camera in accordance with a fourth preferred embodiment of the present invention. The camera of the fourth embodiment has multiple operational modes, and it further has multiple operational contents for the various operational modes. This is a camera in which the mode setting operations can easily be preformed, because the multiple operational modes and operational contents are set in a stratified structure.

As shown in FIG. 13, the top surface of the camera contains the following switches: a mode selection switch 201 on which the word "FUNCTION" is printed; a mode contents set switch 202 on which the word "SET" is printed; a custom memory switch 203 on which the letters "QR" is printed; a focus area set switch 204 on which is the letter "O" is printed; and a release switch 208. All of these switches are push button type switches. The word "FUNCTION", the word "SET", the letters "QR", and the letter "O" each have their own unique color. The external shape of mode selection switch 201 is fan shaped and the external shape of mode contents set switch 202 is semicircular.

A slide type power source switch 205 and a rotational type electronic dial 207 are positioned on the top surface of camera body 10. Only a small part of electronic dial 207 extends from the top surface of the camera body 10.

Figure 31:
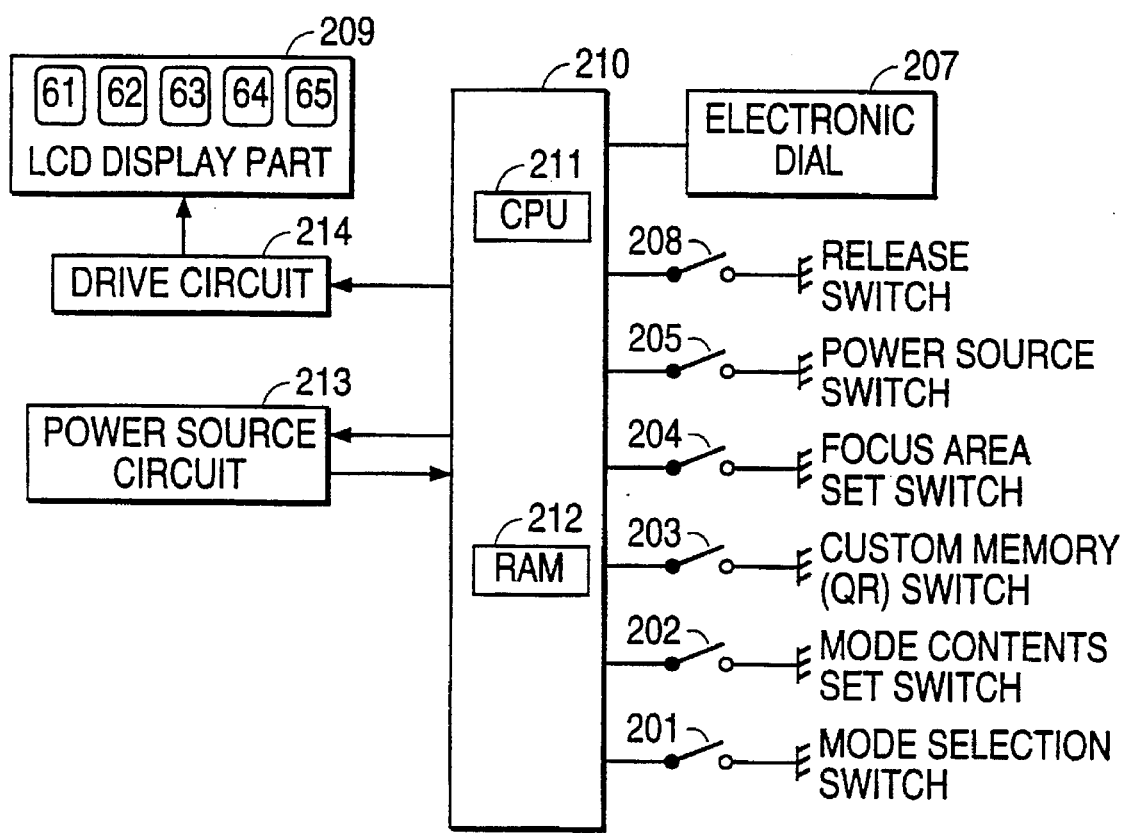
FIG. 31 is a block diagram of a camera in accordance with the fourth embodiment of the present invention.

As shown in FIG. 31 for the fourth embodiment, the mode selection switch 201, the mode content set switch 202, the custom memory switch 203, the focus area set switch 204, the power source switch 205, the electronic dial 207 and the release switch 208 are connected to control processing device 210 which is positioned within the body. Processing device 210 includes a CPU 211 and RAM 212.

In order to select a specific operational mode from among the multiple operational modes, a photographer must manipulate the mode selection switch 201. After the specific operational mode has been selected, the detailed contents of that operational mode are further set by manipulating the mode contents set switch 202. The mode contents set switch 202 is the switch used for commencing and concluding the mode setting operations. The electronic dial 207 is the switch for selecting the specific operational mode and the specific contents.

In the fourth embodiment, there are six operational modes that can be selected by manipulating the mode selection switch 201 and electronic dial 207. The six operational modes are film sensitivity, winding mode, focus area mode, exposure mode, light measurements mode, and strobe mode. Moreover, it is possible to set more detailed operational contents in every mode using mode contents set switch 202, and electronic dial 207. A detailed description of this will be provided below. The custom memory switch 203 activates a mode in which the camera setting status (function) is memorized. The focus area set switch 204 activates a mode in which, during automatic focus, the area to undergo distance measurement is set. The power source switch 205 is a power ON/OFF switch and connects the internal power source circuit 213 with the processing device 210. The release switch 208 directs the processing device 210 to conduct photography.

The custom memory switch 203 and the focus area set switch 204 are switches used to select the operation modes and mode content. It is possible to configure mode selection switch 201 and mode content set switch 202 so that they could set the custom memory mode and the focus area set switch. However, in consideration of the fact that these modes are frequently used, the custom memory switch 203 and the focus area set switch 201 were assigned independent switch locations.

The liquid crystal display (LCD) part 209 is positioned on the upper right surface of the camera body 10. The LCD display part 209 comprises: a divided display part 261 which displays the film sensitivity, winding mode, focus area mode, exposure mode, light measurements mode, and strobe mode; a divided display part 262 which displays the above mentioned selection contents of each mode and the photographic frame number; a divided display part 263 which displays the user custom memory (QR); a divided display part 264 which displays the switching of the auto focus areas; and a divided display part 265 which displays the other necessary functions. These divided display parts 261, 262, 263, 264, and 265 are segmented displays.

The divided display part 261 is a fan shaped display region. The divided display part 262 is a display region with a semicircular shape. The reason that the external shape of mode selection switch 201 is fan-shaped is because the external shape of the display region of divided display part 261 is fan-shaped. As a result, it is easy to visually recognize the switch to be manipulated when modifying the display of divided display part 261. Similarly, the external shape of mode contents set switch 202, which is manipulated when modifying the display of divided display part 262 (when setting the contents), is semicircular in shape so that it corresponds with the external shape of the display region of divided display part 262. As a result, the visual recognition characteristics are improved. Furthermore, the center of the fan-shape of divided display part 261, and the center of the semicircle of divided display part 262 are positioned on the top surface of the camera body 10 so that they are aligned with the center of rotational electronic dial 207.

Figure 17:
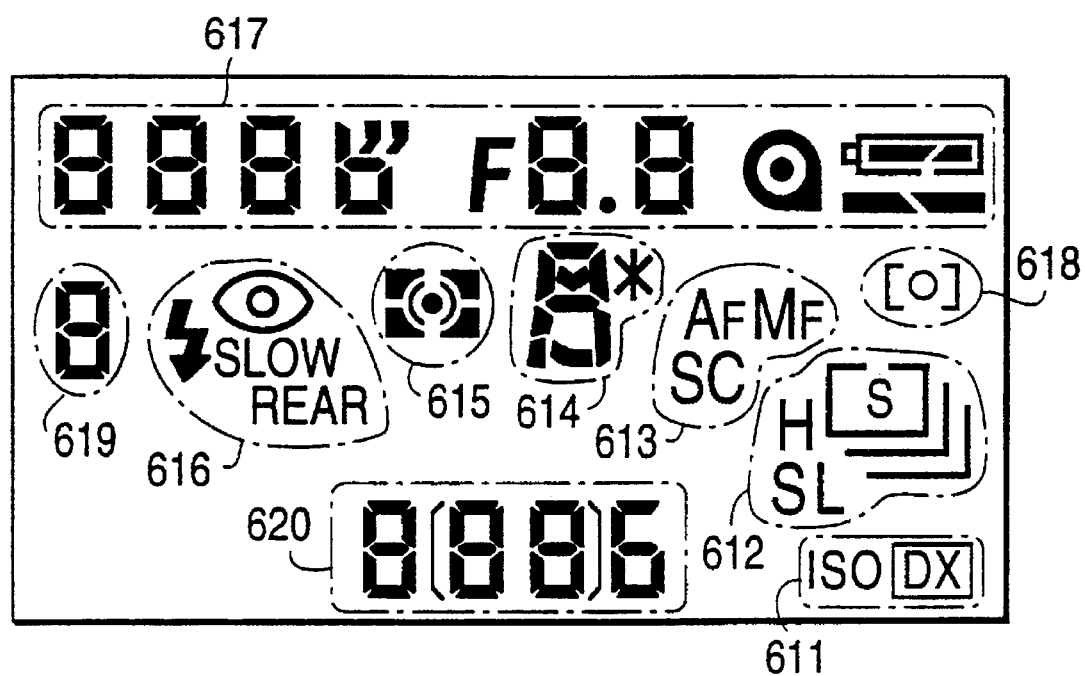
FIG. 17 is a diagram illustrating the electrode pattern of liquid crystal cells in the LCD display part in FIG. 14 in accordance with the fourth embodiment of the present invention.

The fan-shaped display region of divided display part 261 is divided into eight regions. Six of the eight regions that are sectioned off respectively correspond with the six operational modes which are: the film sensitivity, the winding mode, the focus area mode, the exposure mode, the light measurement mode and the strobe mode. As shown in FIG. 17, the operational modes are displayed in segmented patterns 611, 612, 613, 614, 615, 616, 617, 618, 619 and 620. Two of the eight regions are blank displays because there is no corresponding operational mode. These two regions will be filled when new operational modes are added.

As shown in FIG. 31 for the fourth embodiment, a drive circuit 214 is connected to the LCD part 209. Drive circuit 214 is connected to the processing device 210. The drive circuit 214 is positioned within the camera body 10.

Figure 14:
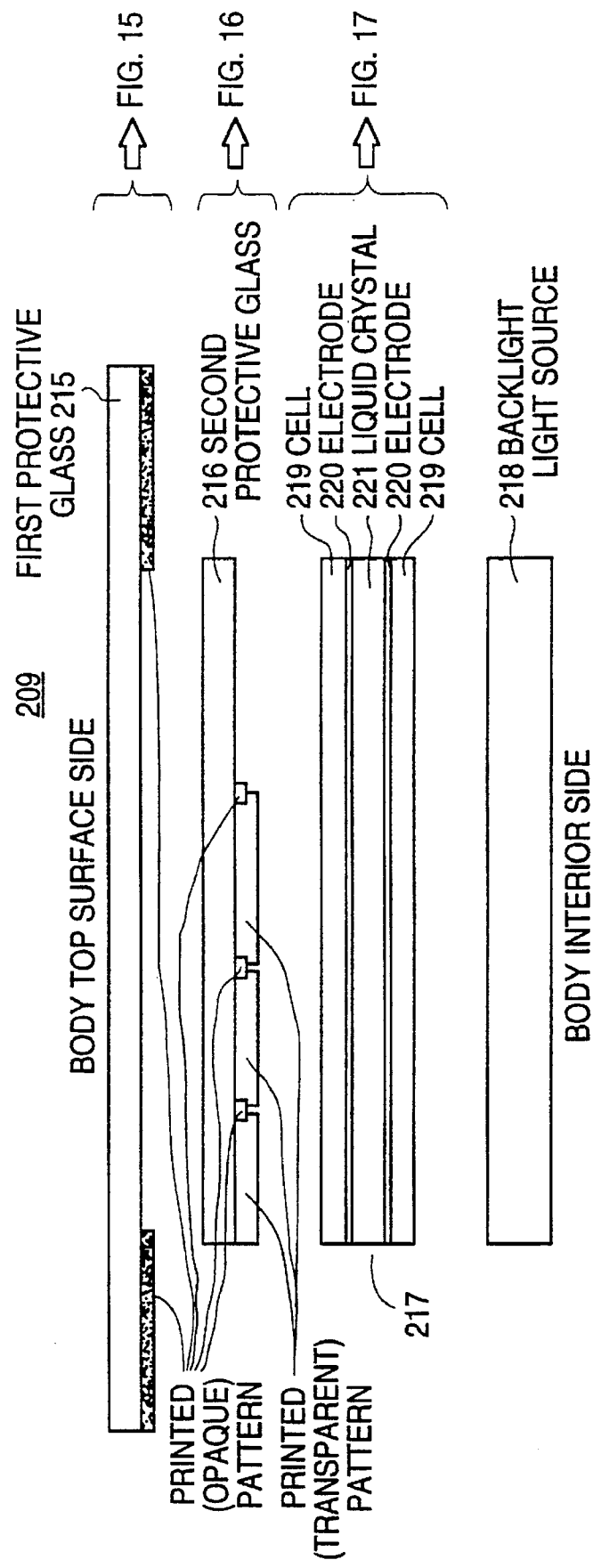
FIG. 14 is a diagram illustrating the configuration of an LCD part of a camera in accordance with the fourth embodiment of the present invention.

FIG. 14 is a cross sectional view of the LCD display part 209. The LCD display part 209 comprises four members stacked in the following order: a first protective glass 215, a second protective glass 216, a liquid crystal cell 217, and a back light source 218.

Figure 15:
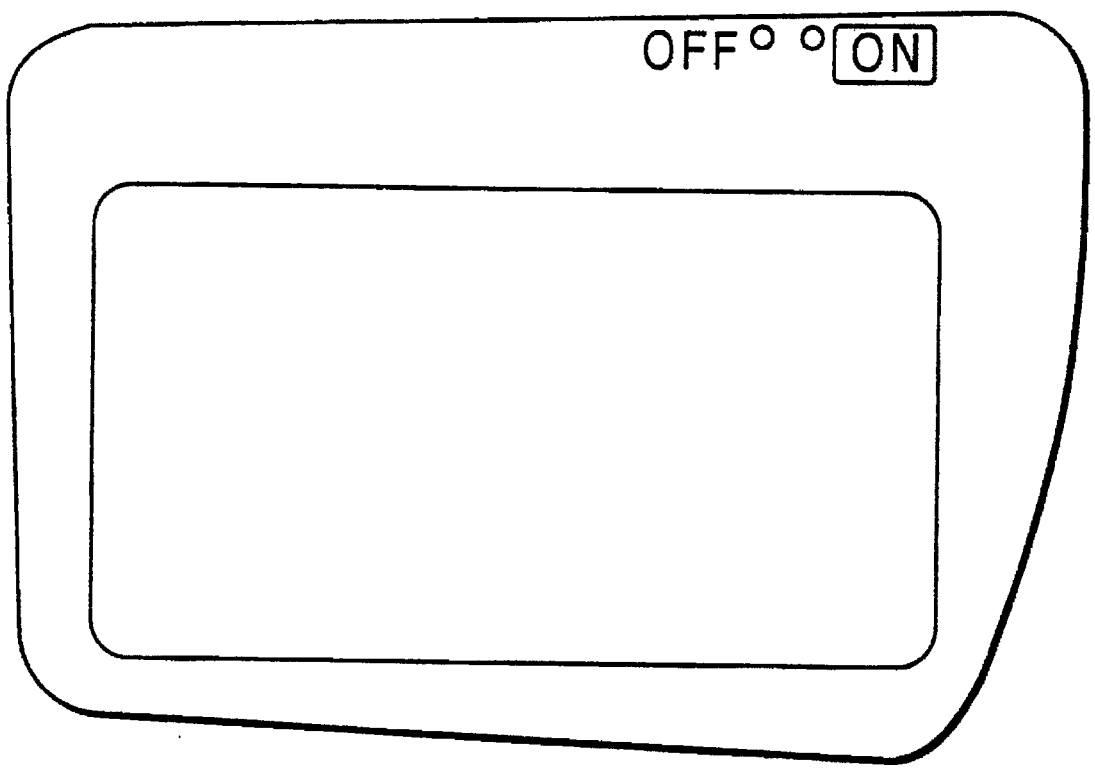
FIG. 15 is a diagram illustrating a printed pattern on a first protective glass of the LCD display part in FIG. 14 in accordance with the fourth embodiment of the present invention.

As shown in FIG. 15, an outline of a frame is imprinted on the back surface of first protective glass 215. Furthermore, the phrase "OFF/ON" is imprinted on the back surface of the first protective glass 215. The frame is printed in a black pigment and the "ON/OFF" is printed in a white pigment.

Figure 16:
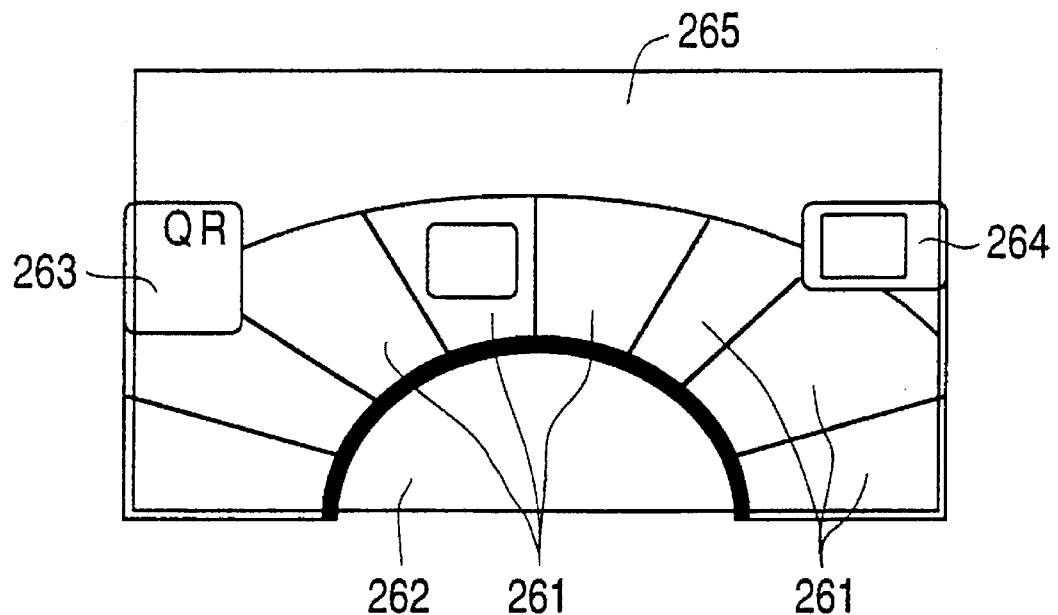
FIG. 16 is a diagram illustrating a printed pattern on a second protective glass of the LCD display part in FIG. 14 in accordance with the fourth embodiment of the present invention.

A second protective glass 216 covers and protects a liquid crystal cell 217, and a pattern shown in FIG. 16 is printed on the back surface of the second protective glass 216 in opaque pigment and transparent pigment. The pattern of FIG. 16 comprises: a frame which sections off divided display parts 261, 262, 263, 264, and 265; a square shaped pattern arranged in one of the frames of the eight frames sectioned off in divided display part 261; the characters "QR" within divided display part 263; and the square shaped pattern within divided display part 264. The entire surface of the region within the frame of divided display part 261 is coated with a light transparent pigment of the same color as the word "FUNCTION" which is printed on mode selection switch 201. The region within the frame of divided display part 262 is coated with a light transparent pigment of the same color as the word "SET" which is printed on mode contents set switch 202. The region within the frame of divided display part 263 is coated with a light transparent pigment in the same color as the letters "QR" which are printed On the custom memory switch 203. The region within the frame of divided display part 264 is coated with a light transparent pigment in the same color as the letter "O" of focus area selection switch 204. The region within the frame of divided display part 265 is not coated with a transparent pigment because there is no corresponding manipulation switch. It is important to note that other substances could be substituted for the transparent pigments described above.

The liquid crystal cell 217 comprises two cells 219 in which liquid crystals 221 are packed between two electrodes 220 that are arranged on the interior surface of the cell. The electrodes 220 are formed in the shape of the segments 611–619 shown in FIG. 17. Electrodes 220 are connected to the drive circuit 214, and the segments 611–619 go ON and OFF according to the signals from drive circuit 214.

Figure 18:
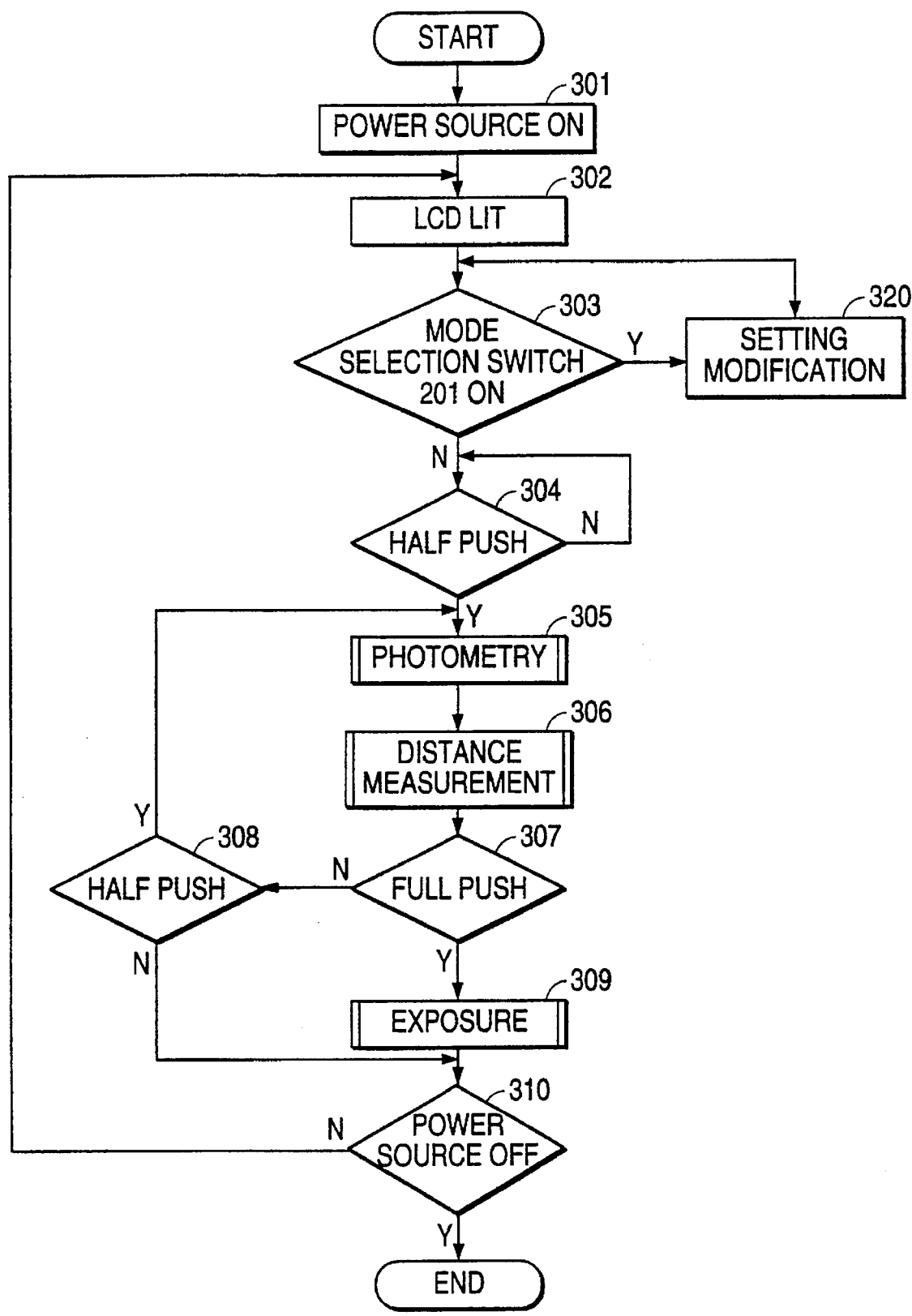
FIG. 18 is a flow chart illustrating the operation of a camera in accordance with the fourth embodiment of the present invention.

FIG. 18 is a flow chaff showing the mode selection process in accordance with the fourth preferred embodiment of the present invention.

If the camera source power source switch 205 is ON (as shown in step 301), then the CPU 211 of processing device 210 reads the program that is stored in the RAM 212, and executes the operations indicated in FIG. 18. Specifically, if the power source is turned ON at step 301, then the default setting values of the previous settings from the last time the power source switch 205 was turned OFF are displayed on LCD display part 209 (step 302). Before the camera is turned OFF, the setting contents of the default set values and the mode selections are stored in the RAM 212 within processing device 210. Next the program determines if the mode selection switch 201 is turned ON (step 303). If the settings for the photographic mode are modified when the mode selection switch 201 is ON (step 303), then the operational flow advances to setting modification (step 320). If the switch 208 is pressed half way (step 304), then the operational flow advances to the photographic operations (steps 305 to 309).

The following is a description of the photographic operation process. If the release switch 208 is pressed half way down at step 304, then processing device 210 commands the light measurement device (not indicated in the diagram) to begin light measurement and the distance measurement mechanism (not indicated in the diagram) is directed to begin distance measurement (step 306). If the release switch 208 is fully pressed down, then the film is exposed by opening the shutter (not indicated in the diagram) (step 309). If release switch 208 is not fully pressed down at step 307 then a decision is made whether to stop or continue photography at step 308. If release switch 208 is pressed down halfway at step 308, then photography is continued and the operational flow returns to step 305. If release switch 208 is not pressed down halfway then photography is ended and the operational flow advances to step 310. At step 310, if power source switch 205 is not OFF then the operational flow returns to step 302. If power source switch 205 is OFF, then the operation is ended.

Figure 19:
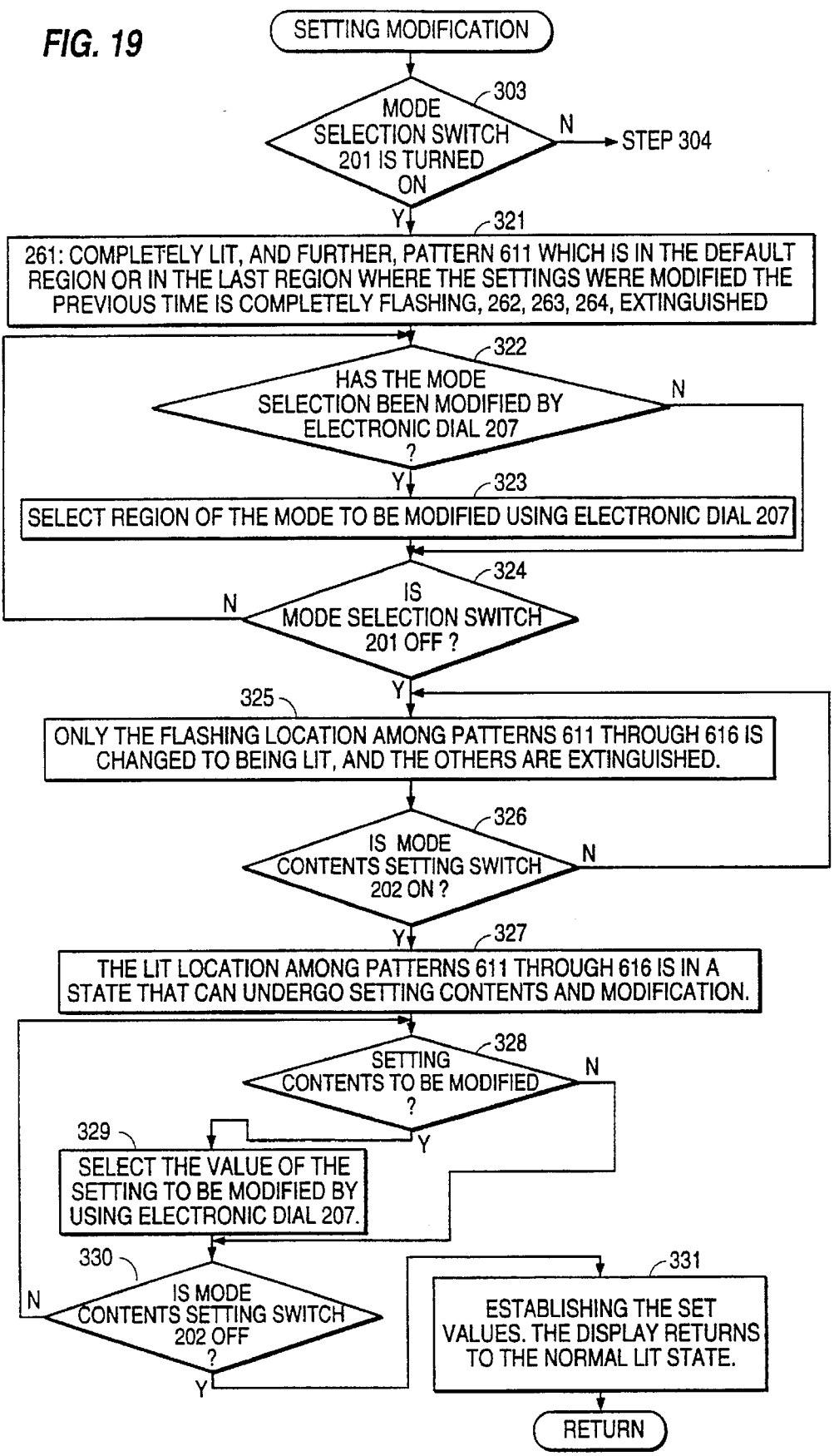
FIG. 19 is a flow chart illustrating the operation of modifying the mode selection settings from among the operations of a camera in accordance with the fourth embodiment of the present invention.

FIG. 19 is a flow chart showing how the operation of selecting modes and modifying contents in step 320 is accomplished. If mode activation switch 201 is ON at step 303, then processing device 210 commands drive circuit 214 to light all of the segment patterns 611 through 616 of divided display region 261. In addition, all of the segmented patterns of the regions corresponding to the default settings mode or the modes selected in the previous settings are made to flash (step 321). This indicates that the mode corresponding to the segment that is flashing is ready to be set.

Next, if the mode selection switch 201 is depressed and if the electronic dial 207 is rotated (step 322) then in accordance with the amount of rotation the processing device 210 will cause the segments 611 through 616 to flash (step 323). The flashing indicates the mode corresponding to the segment that is flashing is ready to be set. For example, if pattern 611 is flashing, then the film sensitivity is ready to be set. However, if mode selection switch 201 is not depressed, then the successive rotation of the electronic dial 207 will not cause the segments 611 through 616 to flash.

If mode selection activation switch 202 is released (step 324), then only the previous flashing segment in divided display part 261 is eliminated and the other segments are extinguished (step 325). In step 322, if the electronic dial 207 has not been rotated then the flow advances directly to step 324. If the electronic dial has not been rotated, then the selection mode made prior to modification or the default setting mode is eliminated.

In the scenario where only the segment corresponding to the mode to be selected is eliminated (step 325), if the mode contents set switch 202 is depressed (step 326), then the mode corresponding to the segment which is eliminated is in a state in which the specific contents of the eliminated segment can be modified (step 327). For example, if segment 611 is illuminated then the mode that sets film sensitivity is in a state in which it can be modified. As a result, the contents of the film sensitivity mode can be set. The film sensitivity mode comprises two options. The first is the mode in which the film sensitivity is automatically set, and the second in the mode in which the "ISO" is set. The contents of the film sensitivity mode are set by rotating the electronic dial 207 (step 328). The rotation of electronic dial 207 causes the processing device 210 to illuminated the segment 611. The letter "DX" which represent express automatic read mode, or the letters "ISO" which represent the manual "ISO" setting will be displayed in illuminated segment 611. All other segments will be extinguished. If the manual "ISO" setting is selected then a numerical value is displayed on divided display region 262 (step 329). The numerical value displayed in display region 262 is adjusted by the rotation of the electronic dial 207. If mode contents set switch 202 is released (step 330) then the processing device 216 modifies the contents memorized in RAM 212. The contents stored in the RAM 212 will be the mode selection choices displayed in segments 611 through 616 of divided display parts 261 and 262. These new values will be stored in the RAM and establish the setting contents (step 331). As shown in FIG. 13 the LCD display part 209 displays the information that is stored in the RAM 212. Moreover, the information that is stored in the RAM 212 governs the photography procedures discussed in the texts corresponding to steps 304 through 309 of FIG. 18.

The photographic frame number is displayed on divided display part 262 when the display of the mode contents is not being executed.

FIGS. 20 through 26 will be referenced to explain the setting contents and the display patterns of divided display part 261. All of the modes will be discussed except for the film sensitivity set mode.

FIG. 20 is a chart illustrating all of the symbols and options associated with the winding mode. If the winding mode is selected at step 322 then the following options may be selected: single shot, high speed continuous shooting, low speed continuous shooting, and silent continuous shooting. Single shot is a mode in which one frame of film is wound when the release switch 208 is depressed. High speed continuous shooting is a mode in which multiple film frames are wound at predetermined time intervals when the release switch 208 is depressed. Slow speed continuous shooting is a mode in which multiple frames of film are wound at predetermined time intervals slower then that of high speed continuous shooting. Silent continuous shooting is a mode in which multiple frames of film are wound and the winding noise is suppressed. The symbols for the above described winding modes are displayed in the second block from the right end of display part 261. A mode setting display is not shown on divided display part 262.

FIG. 21 is a chart illustrating all of the symbols and options associated with the focus area mode. If the focus area mode is selected at step 322, then the following options may be selected at step 328: manual focus, auto focus S, or auto focus C. Manual focus is a mode in which the lens is manually focused. Auto focus modes S and C are modes in which the lens is automatically focused. In the auto focus modes S and C, the camera performs distance measurement as described in step 306 of FIG. 18. In the auto focus mode S, a picture cannot be taken until an image is in focus, even if the release switch 208 is depressed. In auto focus mode C, a picture can be taken when the release switch 208 is depressed, even if the lens has not moved into the focus position. The symbols for the above described focus area modes are displayed in the third block from the right end of divided display part 261. A mode setting display is not shown on divided display part 262.

Figures 22, 23:
FIG. 22 is a diagram illustrating the contents that can be set in the exposure mode and the display symbols corresponding to the various exposure mode settings of a camera in accordance with the fourth embodiment of the present invention.
FIG. 23 is a diagram illustrating the contents that can be set in a light measurement mode and the display symbols corresponding to the various light measurement mode settings of a camera in accordance with the fourth embodiment of the present invention.

FIG. 22 is a chart illustrating all of the symbols and options associated with the exposure mode. If the exposure mode is selected at step 322, then the following options may be selected at step 328: program, speed priority, aperture priority, manual, or program shift. Program is a mode in which the most appropriate shutter speed and the most appropriate aperture value are assigned values that are stored in memory. Speed priority is a mode in which the shutter speed is manually set and the most appropriate aperture value is computed by CPU 211. Aperture priority is a mode in which the aperture value is manually set and the most appropriate shutter speed is calculated by CPU 211. Manual is a mode in which the shutter speed and aperture value is manually set. Program shift is a mode in which the most appropriate value for the shutter speed and the aperture can be modified by the photographer. The symbols for the above described exposure modes are displayed in the fourth block from the right end of divided display part 261. The actual symbols displayed in divided display part 261 are shown in FIG. 22 under the "APPEARANCE OF DISPLAY" column. A mode setting display is not shown in divided display part 262.

FIG. 23 is a chart illustrating all of the symbols and options associated with the light measurement mode. If light measurement mode is selected at step 322 then the following options are presented for selection at step 328: spot light measurement, central emphasis light measurement, or multi-pattern light measurement. Spot light measurement is a mode in which the most appropriate exposure value is determined by measuring the light in the area surrounding the central part of the visual field. Central emphasis light measurement is a mode in which the most appropriate exposure value is determined by measuring the light concentrated in the central part of the visual field. Multi-pattern light measurement is a mode in which the most appropriate exposure value is determined by measuring the light in many different parts of the visual field. The symbols for the above described spot light measurement modes are displayed in the fourth block from the left end of divided display part 261. A mode setting display is not executed on divided display part 262.

FIG. 24 is a chart illustrating all of the symbols and options associated with the strobe mode. If the strobe mode is set at step 322, then the following options are provided at step 328: red eye reduction flash, slow synchro, rear shutter blind synchro, or front shutter blind synchro. Red eye reduction flash is a mode in which a pre-flash strobe is used to reduce the chances of the subjects eyes from appearing red in a photograph. Slow synchro is a mode in which the exposure time exceeds the strobe flash time so that the background surrounding the subject can be included in the photograph. Rear shutter blind synchro is a mode in which the strobe is flashed directly before initiating the running of the shutter rear blind. Front shutter blind synchro is a mode in which the strobe is made to flash directly after concluding the running of the shutter front blind. The symbols for the above described strobe modes are displayed in the third block from the left end of divided display part 261. A mode setting display is not executed on divided display part 262.

FIG. 25 is a chart illustrating all of the symbols and options associated with the address of quick recall mode. The mode setting contents can be modified as described in step 320 of the flow chart of FIG. 18 by manipulating the custom memory switch 203 and the focus area selection switch 204. The custom memory switch 203 serves two purposes. First, the custom memory switch 203 can be used to send information concerning a mode setting to a storage unit to be stored. Second, the custom memory switch can be used to recall the information concerning a mode setting from the storage unit. When the custom memory switch 203 is depressed, the symbol "O" is displayed in divided display part 263. If electronic dial 207 is rotated when the custom memory switch 203 is depressed, then the display on divided display part 263 changes from 0-9 as the dial is rotated. If the custom memory switch 203 is released when one of the numbers from 1-8 is displayed, then the mode setting content which are currently displayed on divided display pans 261 and 264 of LCD display part 209 are stored in a region of RAM 212 corresponding to that number (address location). There is not an address location for the number 0 in the RAM 212. The default mode setting contents are stored in the region of RAM 212 corresponding to the number 9. This is done when the camera is initialized. The symbols that are displayed on divided display part 263 and the address contents at that time are shown in FIG. 25. The symbols 0-9 are indicated by combinations of the display conditions displayed by seven segments. If the custom memory switch 203 is released, then the numbers 0 and 9 disappear from divided display part 263. The numbers 0 and 9 disappear shortly after the custom memory switch is released (approximately 3 seconds). The numbers 1-8 remain illuminated until their setting contents needs to be adjusted. It is important to note that while searching for an address each time the address number is changed, the display on divided display parts 261 and 264 is not stored. The setting contents already stored in the address is displayed on divided display parts 261 and 264. When the custom memory switch 203 is depressed, the stored setting contents are called from storage. If custom memory switch 203 continues to be depressed then prior to the display on divided display part 263 going out, the numbers 0 to 9 are displayed on the divided display part 263. The contents stored in the address corresponding to those numbers can be recalled from storage. The stored contents is displayed on divided display parts 261 and 263. Consequently, each time the display of display part 263 changes, the display on display parts 261 and 264 is also changed.

FIG. 26 is a chart illustrating all symbols and options displayed on display part 263 when recalling an address location.

FIG. 27 is a chart illustrating all of the symbols and options associated with the focus area settings. The focus area set switch 204 activates the mode that sets the distances to be measurement as described in step 306 of the flow chart of FIG. 18. If electronic dial 207 is rotated while the focus area set switch 204 is depressed then the symbol that indicates the wide autofocus mode and the symbol that indicates the spot autofocus mode are intermittently displayed on divided display part 264. The wide autofocus is set by releasing the focus area set switch 204 when the wide autofocus symbol is displayed on divided display part 264. The spot autofocus is set by releasing the focus area set switch 204 when the spot autofocus symbol is displayed on divided display part 264. In the wide autofocus mode the entire range of the finder 14 is considered when taking distance measurements. By contrast, in the spot autofocus mode only the area in the center of the finder is considered when taking distance measurements. The symbols which are displayed on divided display part 264 when setting wide autofocus mode and spot autofocus mode are shown in FIG. 27.

The camera of the fourth preferred embodiment provides multiple operational modes and a stratified structure for selecting those modes. The selection switch 201 and the electronic dial 207 are used to select the modes in the top stratum. The mode contents set switch 202 and electronic dial 207 are used to select the modes of the lower stratum. As a result, all the modes of the camera can be selected by manipulating a total of three switches including the dial. The stratified manner in which the mode selection process is arranged makes it easier for a photographer to operate a multi-function camera.

In addition, the color of switches that control the information being displayed in the display regions is the same color as the information being displayed in the display regions. Furthermore, the external shapes of the switches is the same shape as the external shapes of the display regions. This type of configuration makes a multi-function camera easier to operate. The above described stratified structure eliminates the need for addition switches.

The entire region of divided display parts 261 and 262 is in color. The association between the colors of the display regions and the colors of switches 201 and 202 are easily recognized.

In the alternative, the mode selection switch 201 and mode contents set switch 202 can have colored characters printed on the surface of the switches instead of the entire switch being a uniform color. This is done in order to make the external appearance of the camera more aesthetically pleasing.

The following description relates to a fifth embodiment for a camera in accordance with the present invention.

Figure 28:
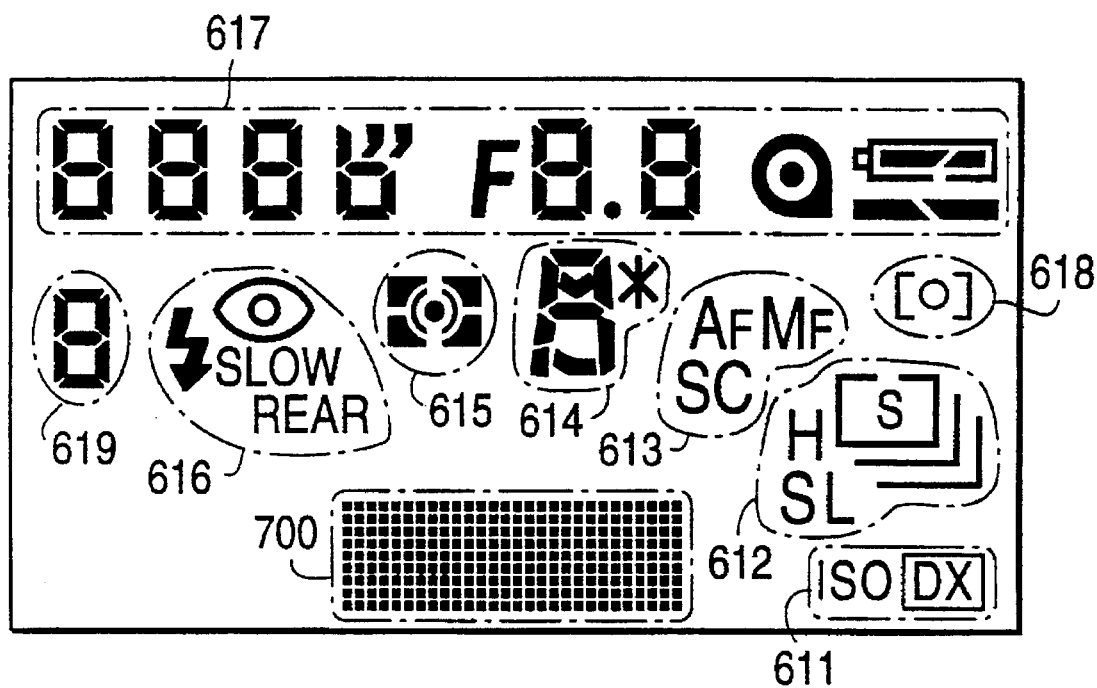
FIG. 28 is a diagram illustrating an electrode pattern of liquid crystal cells in a LCD display part of a camera in accordance with a fifth embodiment of the present invention.

In the camera of the fourth embodiment of the present invention, the LCD display part 209 was a segmented display. In this fifth embodiment, a dot matrix display part 700 is substituted for the LCD display part 262, as shown in FIG. 28. In particular, the pattern of the electrodes of liquid crystal cell 217 in FIG. 14 are structured as they appear in FIG. 28. In the fifth embodiment, the dot matrix display is not limited to a strictly numbers display as in the fourth embodiment of the present invention.

Figure 29:
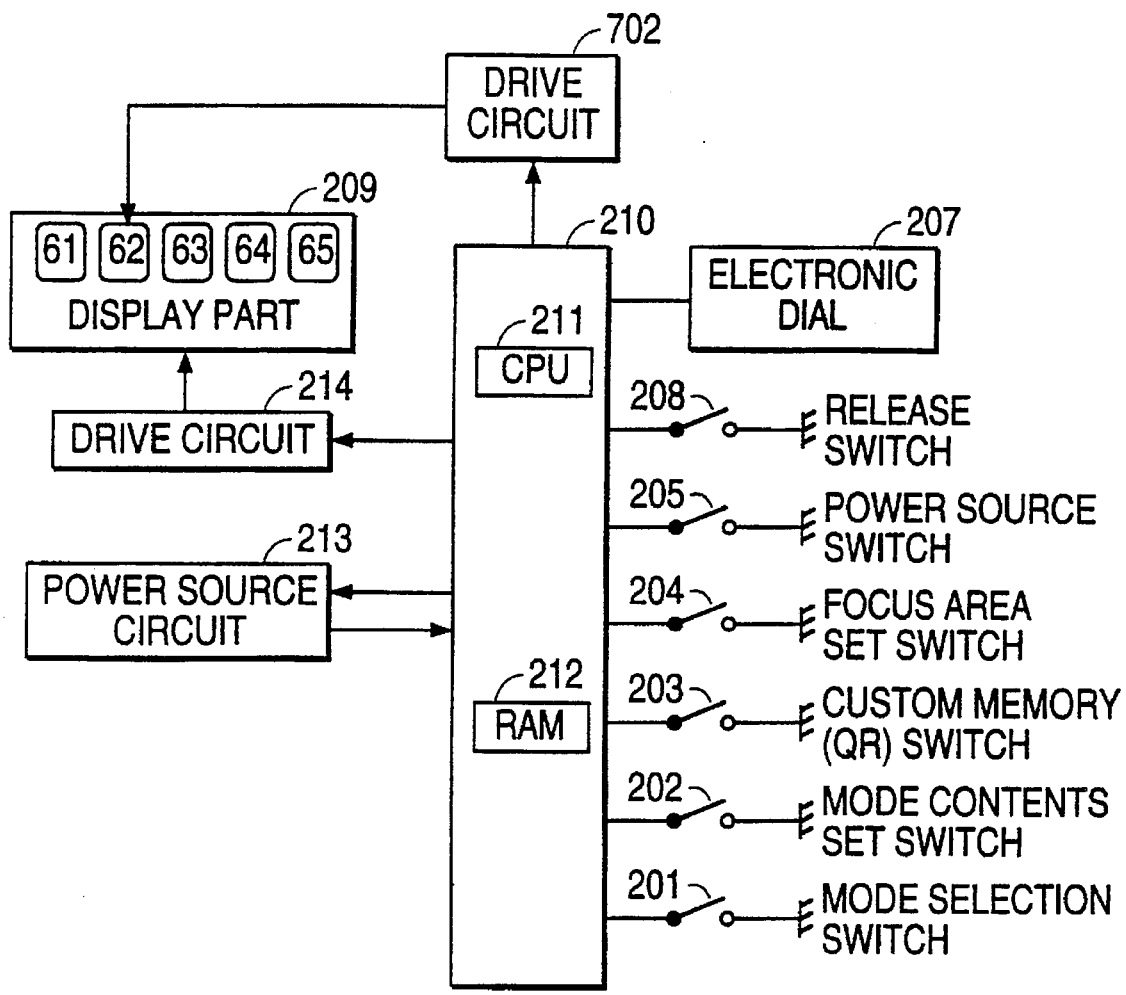
FIG. 29 is a block diagram of a camera in accordance with the fifth embodiment of the present invention.

As shown in FIG. 29, a drive circuit 702 is connected to processing device 210 and dot matrix display part 700. The rest of the configuration is the same as in the fourth preferred embodiment. Thus, an explanation of the rest of the configuration is omitted.

Figure 30:
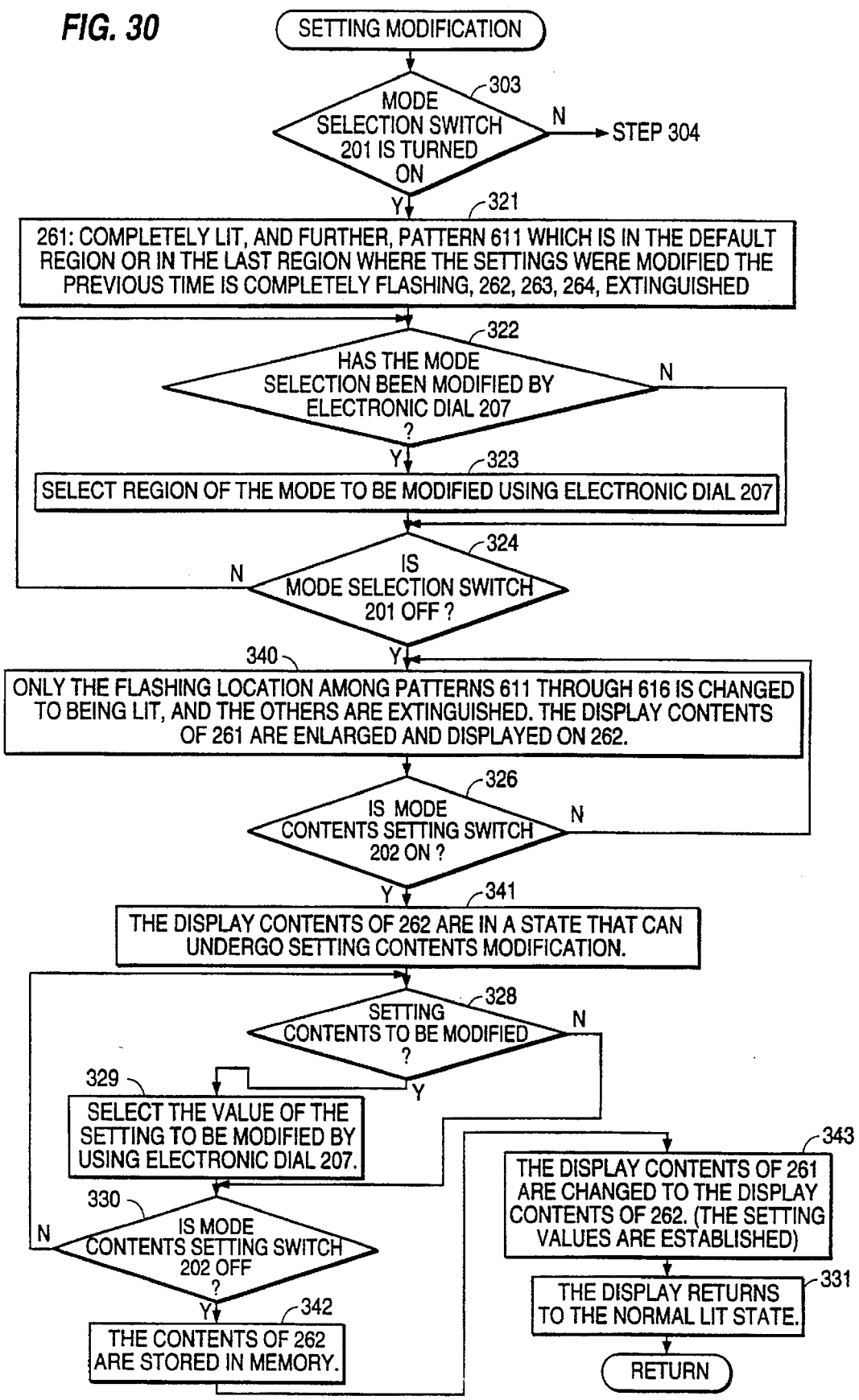
FIG. 30 is a flow chart illustrating the mode setting modification operations of a camera in accordance with the fifth embodiment of the present invention.

In the fifth embodiment of the present invention, the display of divided display part 262 comprises a dot matrix display. FIG. 30 is a flow chart showing how the operation of selecting modes and modifying contents in step 320 of FIG. 18 is accomplished. The steps in the flow chart of FIG. 30 are very similar to the steps in the flow chart of FIG. 19. As a result, the following description will concentrate on the steps that differ.

Specifically, in steps 303 through 324, the modes are selected by rotating electronic dial 207 with mode selection switch 201 depressed. If the mode selection switch 201 is released (step 324), then the flashing patterns of segmented patterns 611 through 616 are illuminated and the other patterns disappear from the display. Furthermore, the illuminated patterns are displayed on the dot matrix of divided display part 262. If mode contents set switch 202 is ON at step 326, then the contents of a mode will be displayed on divided display part 262 and the contents of that mode will be in a state in which it is ready to be modified. (step 341).

As shown in steps 329 and 330, if new values have been selected for the mode contents then the memory contents of RAM 212 are updated to reflect the mode contents corresponding to the pattern displayed on divided display part 262 (step 342). Furthermore, the display contents of divided display part 261 is changed to display the same information as that shown in divided display part 262 (step 343).

In accordance with the fifth embodiment, the pattern which expresses the selected mode and the patterns which are displayed on divided display part 262 are the same. As a result it is easy to confirm the settings, and the multi-function camera is made easier to use.

Although a few preferred embodiments of the present invention have been shown and described, it would be appreciated by those skilled in the art that changes may be made in these embodiments without departing from the principles and spirit of the invention, the scope which is defined in the claims and their equivalents.

What is claimed is:

1. A camera having a plurality of operational modes which are individually selectable, the camera comprising:

a plurality of switches positioned on an exterior surface of the camera, each of said switches corresponding to and selecting an operational mode, each of said switches having a color which corresponds to the operational mode;

a modification switch which modifies a content associated with the selected operational mode; and a display unit having a plurality of regions, each region having a color which respectively corresponds to one of the plurality of operational modes and the color of the respective switches.

2. A camera as claimed in claim 1, wherein the display unit is a color liquid crystal display.

3. A camera as claimed in claim 1, wherein a first group of the plurality of switches is positioned on a first side of the camera and a second group of the plurality of switches is positioned on a second side of the camera.

4. A camera as claimed in claim 1, wherein the switches are provided with color symbols representative of their function and wherein the color of the symbols is the same color as the corresponding operational mode to which the switch is related.

5. A camera as claimed in claim 1, wherein said plurality of switches are positioned adjacent to the display unit.

6. A camera having a plurality of operational modes which are individually selectable, the camera comprising:
- a display unit having a plurality of colors which respectively correspond to the plurality of operational modes,
- the display unit displays the operational mode in a first region;
- the display unit displays a content related to the operational mode in a second region;
- at least one switch adapted to select the operation mode of the camera and has a shape corresponding to the shape of the first region; and
- at least one switch is adapted to set the content related to the operational mode and has a shape corresponding to the shape of the second region.

7. A camera having a plurality of operational modes which are individually selectable, the camera comprising:
- a display unit having a plurality of regions, each region displaying a respective color when a corresponding operational mode is selected, and
- a plurality of switches positioned on an exterior surface of the camera, the switches having a color corresponding to the operational mode to which a switch is related.

8. A camera as claimed in claim 7, wherein the arrangement of the regions in the display unit corresponds to the arrangement of the plurality of switches.

9. A camera as claimed in claim 7, further wherein:
- at least one of the plurality of switches is adapted to select the operation mode of the camera;
- at least one other of the plurality of switches is adapted to set at least one option related to the operation mode selected; and
- said display unit being adapted to display within each region the options set for the operational mode corresponding to the region.

10. A camera as claimed in claim 7, wherein the plurality of switches are arranged around the display unit so that each switch lines up with the region corresponding to the operational mode to which the switch is related.

11. A camera having a plurality of operational modes which are individually selectable, the camera comprising:
- a first display unit having a plurality of regions which respectively correspond to the plurality of operational modes, each region displaying a respective color when the corresponding operational mode is selected;
- a plurality of switches positioned on an exterior surface of the camera, each switch respectively corresponding to and selecting an operational mode, and each switch having a color corresponding to the respective operational mode;
- a modification switch which modifies a content associated with the selected operational mode; and
- a second display unit positioned on a back cover of the camera.

12. A camera as claimed in claim 11, wherein the first display unit is a color liquid crystal display.

13. A camera as claimed in claim 11, wherein the second display unit is a color liquid crystal display.

14. A camera as claimed in claim 11, wherein said plurality of switches are positioned adjacent to the first display unit.

15. A camera having individually selectable photographic data sets corresponding to a photographic mode, the camera comprising:
- a display unit having a plurality of individual regions which each have a different color, said display unit displays, in determined individual regions, respective plural photographic data sets;
- a plurality of switches which select one of the plural data sets so as to alter the content of the plural data set, each switch having a color and a position corresponding to the color of the region which displays the corresponding photographic data set; and
- an altering unit which alters the content of the photographic data set selected by said plurality of switches and displayed in one of the individual regions of the display.

* * * * *